(12) United States Patent
Govorkov et al.

(10) Patent No.: US 7,366,213 B2
(45) Date of Patent: Apr. 29, 2008

(54) MOPA EXCIMER OR MOLECULAR FLUORINE LASER SYSTEM WITH IMPROVED SYNCHRONIZATION

(75) Inventors: Sergei V. Govorkov, Boca Raton, FL (US); Andriy N. Knysh, Boca Raton, FL (US); Alexander O. Wiessner, Goettinge (DE)

(73) Assignee: Lambda Physik AG, Goettingen (DE)

( * ) Notice: Subject to any disclaimer, the term of this patent is extended or adjusted under 35 U.S.C. 154(b) by 337 days.

(21) Appl. No.: 10/847,071

(22) Filed: May 17, 2004

(65) Prior Publication Data
US 2004/0240507 A1    Dec. 2, 2004

Related U.S. Application Data

(60) Provisional application No. 60/511,866, filed on Oct. 16, 2003, provisional application No. 60/497,682, filed on Aug. 25, 2003, provisional application No. 60/471,652, filed on May 19, 2003.

(51) Int. Cl.
*H01S 3/00* (2006.01)

(52) U.S. Cl. .................. 372/38.07; 372/55; 372/57

(58) Field of Classification Search ............. 372/38.07, 372/55
See application file for complete search history.

(56) References Cited

U.S. PATENT DOCUMENTS 6,005,880 A * 12/1999 Basting et al. ........... 372/38.04

| 6,370,174 | B1 | 4/2002 | Onkels et al. ........... 372/38.04 |
| 6,381,257 | B1 | 4/2002 | Ershov et al. ................. 372/57 |
| 6,549,551 | B2 | 4/2003 | Partlo et al. ............. 372/38.07 |
| 6,556,600 | B2 | 4/2003 | Sandstrom et al. ........... 372/25 |
| 6,590,922 | B2 * | 7/2003 | Onkels et al. ................. 372/57 |
| 6,618,421 | B2 * | 9/2003 | Das et al. ..................... 372/55 |
| 6,690,704 | B2 | 2/2004 | Fallon et al. ................. 372/58 |
| 6,721,344 | B2 | 4/2004 | Nakao et al. ................. 372/55 |
| 6,741,627 | B2 | 5/2004 | Kitatochi et al. ............. 372/57 |
| 2002/0012376 | A1 | 1/2002 | Das et al. ..................... 372/58 |
| 2002/0085606 | A1 | 7/2002 | Ness et al. .................... 372/55 |
| 2002/0154668 | A1 * | 10/2002 | Knowles et al. ............. 372/55 |
| 2003/0099269 | A1 | 5/2003 | Ershov et al. ................ 372/55 |
| 2004/0047386 | A1 | 3/2004 | Das et al. ..................... 372/55 |
| 2004/0057489 | A1 | 3/2004 | Fallon et al. ................. 372/57 |

* cited by examiner

*Primary Examiner*—Minsun Oh Harvey
*Assistant Examiner*—Tod T. Van Roy
(74) *Attorney, Agent, or Firm*—Stallman & Pollock, LLP

(57) ABSTRACT

The relative timing delay between channels of a discharge circuit can be adjusted through application of appropriate control voltages. A control voltage of relatively long duration and relatively small voltage, with respect to a common system pulse, can be applied to any channel in order to adjust the relative timing delay. This control voltage can be, for example, a magnetization pre-pulse voltage applied to an indictor for a channel in order to adjust a hold-off time. A synchronization control unit and feedback loop can be used to monitor the timing, such that the syncronization control unit can apply a control voltage when a delay change exceeds a timing adjustment threshold value, and can apply a pre-ionization voltage when the delay change is less than the adjustment threshold value. Using both a control voltage and a pre-ionization voltage provides for both coarse and fine adjustment of the delay.

46 Claims, 11 Drawing Sheets

MOPA EXCIMER OR MOLECULAR FLUORINE LASER SYSTEM WITH IMPROVED SYNCHRONIZATION

CLAIM OF PRIORITY

This patent application claims priority to U.S. provisional patent applications "MOPA EXCIMER OR MOLECULAR FLUORINE LASER SYSTEM WITH IMPROVED SYNCHRONIZATION," No. 60/471,652, filed May 19, 2003; "MOPA EXCIMER OR MOLECULAR FLUORINE LASER SYSTEM WITH IMPROVED SYNCHRONIZATION," No. 60/497,682, filed Aug. 25, 2003; and "MOPA EXCIMER OR MOLECULAR FLUORINE LASER SYSTEM WITH IMPROVED SYNCHRONIZATION," No. 60/511,866, filed Oct. 16, 2003; each of which is hereby incorporated herein by reference.

FIELD OF THE INVENTION

The present invention relates to synchronization and time delays in high power excimer or molecular fluorine lasers, such as are useful for applications in microlithography and semiconductor processing.

BACKGROUND

Semiconductor manufacturers are currently using deep ultraviolet (DUV) lithography tools based on KrF-excimer laser systems, operating at wavelengths around 248 nm, as well as ArF-excimer laser systems, which operate at around 193 nm. Vacuum UV (VUV) tools are based on $F_2$-laser systems operating at around 157 nm. These relatively short wavelengths are advantageous for photolithography applications because the critical dimension, which represents the smallest resolvable feature size that can be produced photolithographically, is proportional to the wavelength used to produce that feature. The use of smaller wavelengths can provide for the manufacture of smaller and faster microprocessors, as well as larger capacity DRAMs, in a smaller package. In addition to having smaller wavelengths, such lasers have a relatively high photon energy (i.e., 7.9 eV) which is readily absorbed by high band gap materials such as quartz, synthetic quartz ($SiO_2$), Teflon (PTFE), and silicone, among others. This absorption leads to excimer and molecular fluorine lasers having even greater potential in a wide variety of materials processing applications. Excimer and molecular fluorine lasers having higher energy, stability, and efficiency are being developed as lithographic exposure tools for producing very small structures as chip manufacturing proceeds into the 0.18 micron regime and beyond. The desire for such submicron features comes with a price, however, as there is a need for improved processing equipment capable of consistently and reliably generating such features. Further, as excimer laser systems are the next generation to be used for micro-lithography applications, the demand of semiconductor manufacturers for powers of 40 W or more to support throughput requirements leads to further complexity and expense.

DETAILED DESCRIPTION

Figure 1:
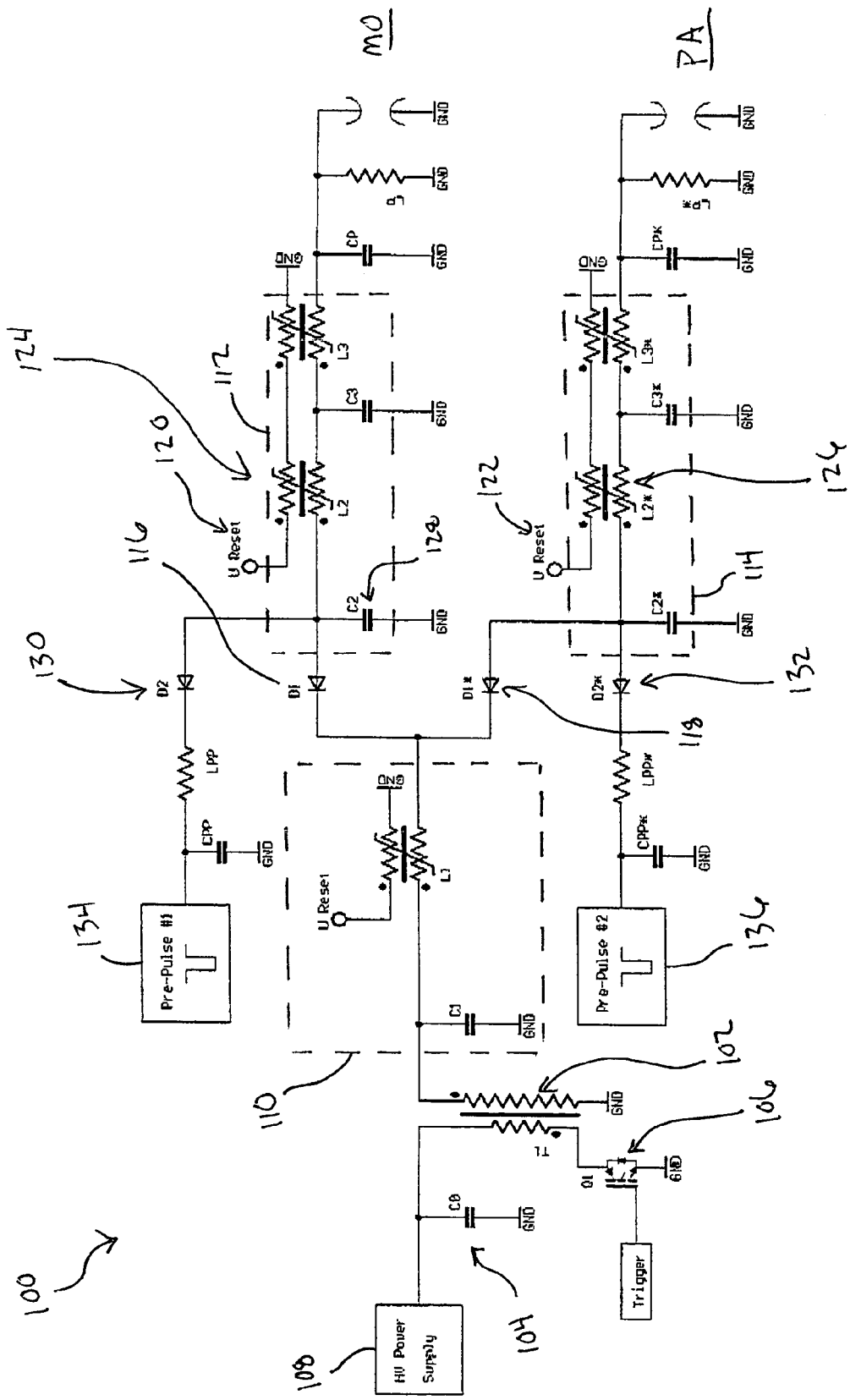
FIG. 1 is an electrical diagram of a discharge circuit in accordance with one embodiment of the present invention.

As semiconductor manufacturers move toward the production of chips with smaller sizes, the requirements on the processing and manufacturing equipment, including the laser light sources, are ever increasing. In laser systems used for photolithography applications, for example, it would be desirable to move toward higher repetition rates, increased energy stability and dose control, increased system uptime, narrower output emission bandwidths, improved wavelength and bandwidth accuracy, and improved compatibility with stepper/scanner imaging systems. It also would be desirable to provide lithography light sources that deliver high spectral purity and extreme power, but that also deliver a low cost chip production. Requirements of semiconductor manufacturers for higher power and tighter bandwidth can place excessive and often competing demands on current single-chamber-based light sources. Many of these obstacles can be overcome by taking advantage of a dual-gas-discharge-chamber technology, referred to herein as MOPA (Master Oscillator—Power Amplifier) technology. MOPA technology is discussed further in U.S. patent application Ser. No. 10/696,979, entitled "MASTER OSCILLATOR—POWER AMPLIFIER EXCIMER LASER SYSTEM," which is hereby incorporated herein by reference. MOPA technology can be used to separate the bandwidth and power generators of a laser system, as well as to separately control each gas discharge chamber, such that both the required bandwidth and pulse energy parameters can be optimized. Using a master oscillator (MO), for example, an extremely tight spectrum can be generated for high-numerical-aperture lenses at low pulse energy. A power amplifier (PA), for example, can be used to intensify the light, in order to deliver the power levels necessary for the high throughput desired by the chip manufacturers. The MOPA concept can be used with any appropriate laser, such as KrF, ArF, and $F_2$-based lasers. Further, a MOPA system can utilize separate switch/pulser systems for each discharge chamber (for the MO and the PA), but the use of separate switch/pulser systems typically leads to problems with synchronization, as controlling the timing between the parallel systems can be difficult.

Master Oscillator Power Amplifier (MOPA) excimer laser systems have an advantage of power scalability combined with ultimate spectral parameters, since power scaling is not compromised by spectrum narrowing as is the case in a single-oscillator laser. One of the biggest hurdles to overcome in MOPA systems is the temporal synchronization of the oscillator and the amplifier. Since the optical gain in lasers such as excimer lasers can be short-lived, syncronization to better than 1 nsec can be desirable. A primary source of delay uncertainty, or jitter, in an excimer laser is the magnetic pulse compressor that forms short, high-current electrical pulses fed into the gas discharge chamber. Existing approaches utilize a common compressor for both the oscillator and amplifier channels, such that the jitter is common for both channels. An example of such an approach is described in pending U.S. patent application Ser. No. 10/699,763, entitled "EXCIMER OR MOLECULAR FLUORINE LASER SYSTEM WITH PRECISION TIMING," which is hereby incorporated herein by reference. Still, the final stages of the compressor have to be separate for each channel in order to de-couple the discharges in two channels. These final stages, however, operate with short pulses and, therefore, contribute little jitter.

In such a "common compressor" approach, there is a need to adjust a relative delay of the output pulses between the two channels. The necessity of adjusting the relative delay comes from the fact that there will be some delay between the onset of the optical gain in the oscillator portion of MOPA, and emission of the output pulse from the oscillator. There also will be a certain optical propagation delay time between the oscillator and the amplifier. Electronic components that define the electrical pulse delay in the final compression stages can have a significant manufacturing tolerance, such that there can be a constant time delay offset between the two channels that requires compensation. Further, gas aging and temperature differences also can effect the delay.

Attempts have been made to adjust the timing between two channels of a discharge circuit, which in some systems would include a regulation of the reset current in the inductors with saturable cores in magnetic compressor stages, in order to vary a magnetic flux content $\Delta\Phi$ of the core. Further information can be obtained by reading U.S. Pat. No. 6,005,880, entitled "PRECISION VARIABLE DELAY USING SATURABLE INDUCTORS," to Dirk Basting et al., which is hereby incorporated herein by reference. Varying the flux content also functions to delay the compressed electrical pulse. A problem with such an approach is that the reset current would have to be controlled with extremely high precision. Such precision can be difficult to implement on the time scale required, as such a process would be very slow relative to the speed of the pulse. In another approach, additional windings can be used on the saturable core in order to remove some of the flux content with a voltage pulse of controlled amplitude and duration. A problem with such an approach is that such pulses can induce currents in the inductor winding, thus leading to inaccuracies in the resulting magnetization.

Systems and methods in accordance with various embodiments of the present invention can overcome deficiencies in existing multichamber arrangements by adjusting a relative time delay between two channels of a discharge circuit, such as in a MOPA laser system. In one embodiment, sufficiently precise control of the state of magnetization of the cores can be obtained without the problems and/or limitations associated with previous approaches. A voltage source can be used to apply a control voltage to one of the compression branches of the MOPA system, such as a source of relatively low-voltage pre-pulse voltage being used for magnetization control and/or a source of pre-ionization as described below. For example, FIG. 1 illustrates an electrical diagram of a discharge circuit 100 in accordance with one embodiment. This exemplary circuit includes two channels, such as a channel for a master oscillator (MO) and a channel for a power amplifier (PA) of a MOPA system. The channels have a common pulse, step-up transformer $T_1$ 102, with the primary winding of the transformer being connected to a storage capacitor $C_0$ 104 and solid state switch $Q_1$ 106, such as a thyristor or IGBT as known in the art. Storage capacitor $C_0$ 104 is charged by a high voltage power supply 108. Both channels utilize a common first compression stage 110 consisting of capacitor $C_1$ and an inductor $L_1$ with a saturable core. The compression branches 112 and 114 can each include one or more final compression stages, with each branch in this example including two final compression stages defined by $C_2$, $L_2$, $C_3$, $L_3$ and $C_2'$, $L_2'$, $C_3'$, $L_3'$ for MO and PA channels, respectively. Diodes $D_1$ 116 and $D_1'$ 118 serve to de-couple the two channels. These diodes essentially prevent energy flow between the channels, such as from $C_2$ into $L_2'$ in the event that the $L_2'$ saturates before $L_2$. It should be recognized that other devices could be used instead of diodes to decouple the two branches. Generally, $L_2$ and $L_3$ can be configured such that applying a magnetic pre-pulse to $L_2$ does not appreciably affect the flux content of $L_3$.

The output stages of the compressors can be loaded onto the respective discharge chambers. Using common components for the two channels up to the compression branches can help to minimize the relative time delay and/or time jitter between the channels. A current pulse becomes shorter as that pulse progresses through subsequent compression stages, each of which can reduce the pulse length by a factor of 5-10, for example. The uncertainty of the compressor "hold-off" (and therefore, time delay) then becomes progressively smaller towards the final stages, such that the contribution of the final stages to the total jitter can be minimal. At the same time, separate final compressor stages can be utilized in order to de-couple the discharge chambers. Such de-coupling in principle can be done using diodes, but the high peak current and voltage values in the final stages can preclude such a solution. As such, the diodes can be placed at earlier compression stages where the peak current magnitude is still moderate, such as a magnitude on the order of a few hundred Amperes.

An additional winding can be used at each saturable core inductor to provide a magnetic field with sign opposite to that of the main pulse, so as to return the magnetization of the core to its original state after each pulse and maximize the flux content of the core. The current can be provided by additional DC sources 120, 122 shown as "U reset" in FIG. 1. Circuits and methods for providing such a reset current are well known in the art.

Adjustment of the time delay can be accomplished by reducing and/or controlling the amount of magnetic flux content $\Delta\Phi$ of the core of inductor $L_2$ 124 and/or $L_2'$ 126, depending upon whether the delay is to be increased (by speeding up the master oscillator channel pulse by decreasing the flux content of inductor $L_2$) or decreased (by speeding up the power amplifier channel pulse by decreasing the flux content of inductor $L_2'$). The reduction of magnetic flux content can be accomplished by adding a pulse of relatively long duration, and with relatively small voltage, to the main pulse. This additional, low voltage pulse shall be referred to herein as a "magnetization pre-pulse."

While a common pulser circuit can be used to generate high voltage pulses in the two channels, a control voltage circuit can be used to control the relative timing of the two high voltage pulses. Once the two high voltage pulses are applied to the discharge chambers of oscillator and amplifier, through the MO and PA channels, respectively, the gain pulse can be created. The lifetime of the gain can be short, however, such as in the range of about 20 ns. In a situation where the light emitted from the oscillator arrives in the amplifier after the gain of the amplifier has decayed, the light will not be amplified. An optimum delay exists between oscillator and amplifier gain pulse, at which the amplification of the light pulse is maximized. The output power from the amplifier can drop appreciably when the delay is off by as little as a few nanoseconds. It therefore can be imperative to precisely measure the relative delay between the oscillator and amplifier discharge, and use that relative delay to set the correct delay in the common pulser.

Figure 10A:
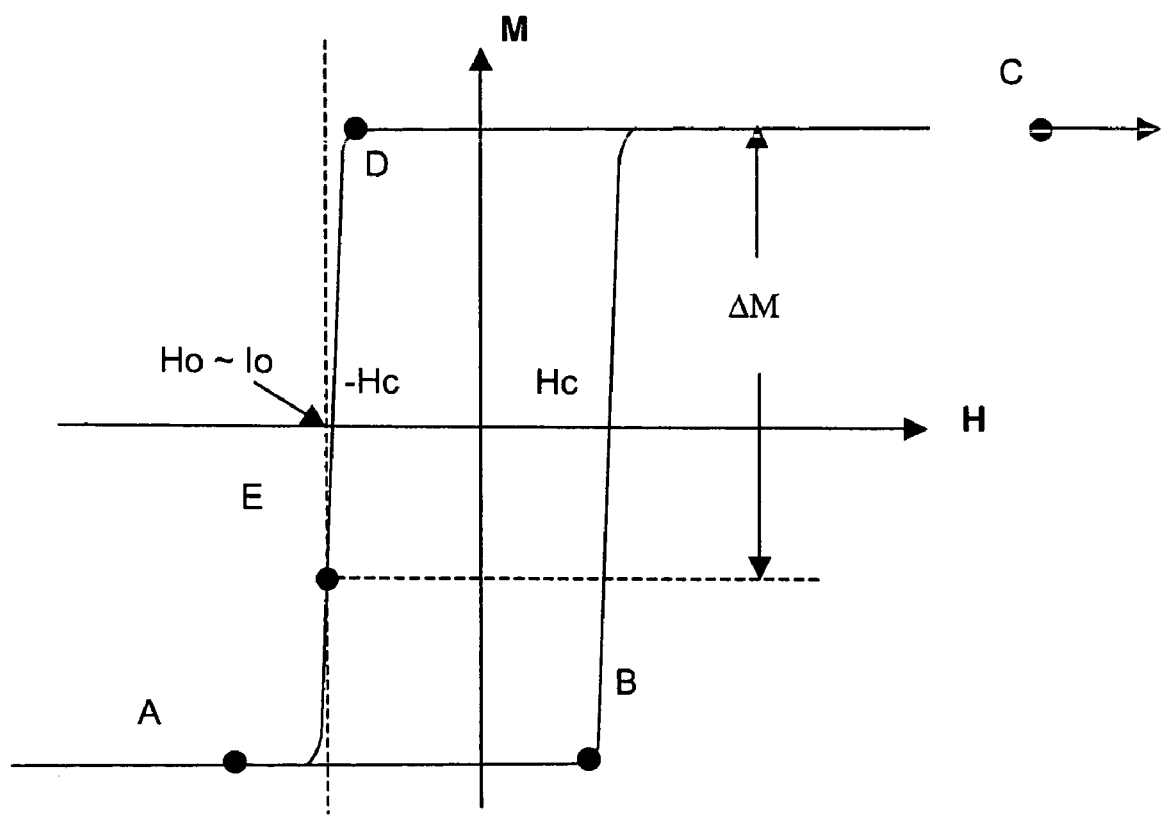
FIGS. 10a-10b are magnetic hysteresis curves which illustrate aspects of the operation of an embodiment of the invention.

In the some prior systems it has been proposed to control the amount of hold-off (which is determined by the amount of magnetic flux stored in the inductor core), by controlling the value of the reset current. FIG. 10a illustrates this technique. Here, magnetization M of a typical saturable core material is plotted against the magnetic field H. The flux content $\Delta\Phi=NS\Delta M$, where N is the number of turns of the winding, S is the cross-sectional area of the core. The system trajectory starts at the state represented by point "A", corresponding to a fully reset core. When the main voltage pulse arrives, it creates magnetic filed, which, when it exceeds coercive field value Hc approximately at point "B", starts re-magnetizing the core. At the peak of the pulse, the core is driven to the state "C" with very high value of current (and magnetic field H). After passing the pulse, reset current returns the core to a partially reset state "E". The idea of prior art is that the position of the state "E", and thus, magnetic content $\Delta M$, can be accurately controlled by controlling the final value of reset current Io.

A difficult with this approach rests on the fact that the M(H) curve at point "E" is extremely steep, corresponding to the magnetic susceptibility on the order of 10,000 to 100,000. Thus, it appears to be quite difficult to control the current with a reasonable degree of accuracy on the time scale of 100 microseconds. To a large extent, the difficulty is in the fact that the actively controlled and, thus, varying reset current induces opposite current in the main winding due to transformer action, that cancels or at least reduces the action of reset current.

Figure 10B:
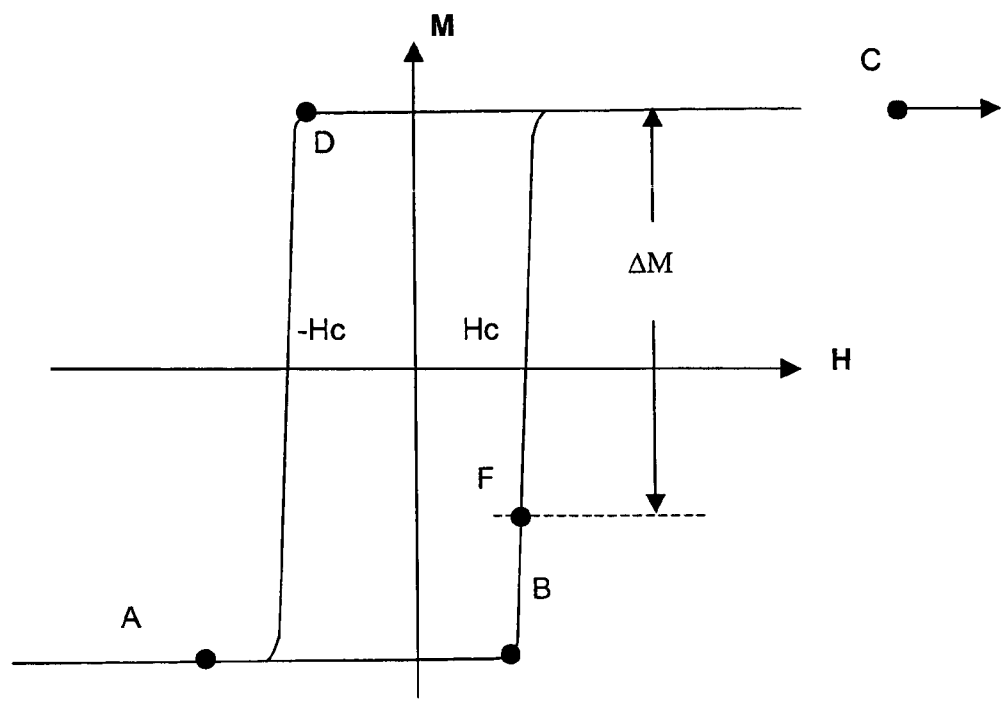

One alternative approach provided herein is to first drive the system to the completely reset state "A" after each pulse, using conventional means, such as a passive reset circuit. After reaching the completely reset state a pre-pulse of a defined voltage is applied during a defined time. This drives the core along the trajectory "A-B-F" in FIG. 10B. Since the passive reset circuit has a large inductor in it, its response is slow, and, therefore, there is no induced counter-current that may resist change of magnetization. Therefore, impedance of the system remains approximately constant, and it is easy to maintain a constant voltage. Additionally, timing of the pre-pulse can be controlled extremely accurately by a computer. Thus, one can remove a very precise amount of flux, and drive the core to a well defined state "F" as shown in FIG. 10b. Importantly, this can be done on the short time scale, immediately preceding the main pulse. The length and amplitude of pre-pulse define the position "F", and, thus, the amount of flux content proportional to $\Delta M$.

As shown above one prior approach suggests controlling the reset current, but as shown above the state of the core magnetization (and thus, flux content) is very sensitive to the reset current magnitude. In one embodiment of the present invention herein, control over the magnetization of core and its flux content is achieved by using the reset current to start from a very well defined state ("A") where the core is saturated with a first magnetization state, by fixing the magnitude of pre-pulse voltage and varying the pre-pulse duration, which is applied to a winding of the inductor such that the core is adjusted from the defined state "A". This technique allows for dramatically improved control over the magnetization of the core and hence better control or the hold off time provided by the inductor.

Figure 2:
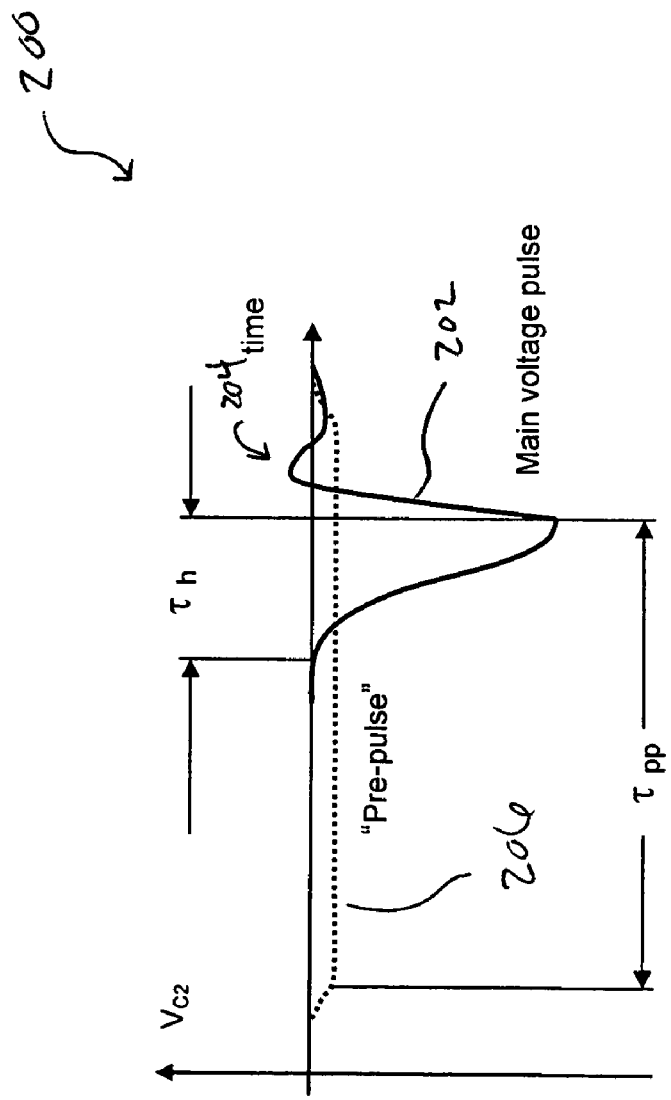
FIG. 2 is a plot of a waveform of the pulse voltage in the circuit of FIG. 1.

FIG. 2 shows a waveform of an exemplary voltage at capacitor $C_2$ (128 in FIG. 1). In absence of a pre-pulse or control voltage, the voltage waveform 202 is represented by the solid line. The capacitor $C_2$ is charged by a resonant charge transfer from capacitor $C_1$, after which inductor $L_2$ saturates, thus initiating transfer to capacitor $C_3$. The time interval $\tau_h$ between the beginning of resonant charge transfer into $C_2$ and saturation of the inductor $L_2$ can be the ordinary hold-off time of $L_2$. The reproducibility of this hold-off time can determine, to a large extent, the amount of time delay jitter. The hold-off time then can be a function of the flux content of the core and the applied voltage, such as is given by:

$$\int V_{C2} dt = \Delta\Phi$$

and in a fully re-set core:

$$\Delta\Phi = 2B_{sat}SN$$

where $B_{sat}$ is the saturated magnetic induction, S is the cross-sectional area of the core, and N is the number of turns in the winding. One way of adjusting the delay then is to vary the voltage of the pulse. Since both channels receive an electric charge from the same source, however, both channels can be affected by such variation, which can lead to the variations of the output pulse energy.

The pre-pulse 206 in FIG. 2 has a relatively long duration $\tau_{pp}$, which can be approximately 10 to 100 times the duration of the main pulse 202, and a relatively low voltage. For purposes of general illustration in one embodiment herein the duration of a pre-pulse voltage could be in the range of up to around 30 µs, and the amplitude of the pre-pulse voltage could be in the range of approximately 30 to 100 volts, and the main pules applied to the electrodes of the discharge chamber could have a duration in the range of 0.5 to 1 µs, and a voltage amplitude in the range of 20-30 kV. Such a pre-pulse can be added to the capacitor in one of the channels, such as to $C_2$ in the MO channel, whereby only that channel will be affected. The voltage-time integral of the pre-pulse as given above can be effectively subtracted from the total flux content $\Delta\Phi$ of the core of $L_2$, which can lead to a variation of the hold-off time for the main pulse in this channel. At the same time, the voltage amplitude of the pre-pulse can be made quite small since the duration of the pre-pulse is much longer than that of the main pulse, such that the output pulse energy is only minimally affected. For example, if the main pulse has an amplitude of 20 kV, and the hold-off is to be reduced by 50 nsec, then the 30-microsecond-long pre-pulse only has to be about 33 V. This voltage comprises just 0.17% of the voltage of the main pulse, or $3*10^{-4}\%$ of the energy of the main pulse.

A source of contol voltage such as the source of magnetization pre-pulse voltage shown in FIG. 2 can require de-coupling from the main pulse. Such decoupling can be accomplished through use of diodes such as diodes $D_2$ and $D_2'$ (130 and 132 in FIG. 1) working in conjunction with diodes $D_1$ and $D_2'$. However, the additional decoupling diodes do not de-couple from the positive overshoot 204 of $V_{C2}$ that can occur immediately after the main pulse 202. The positive overshoot can result from the impedance mismatch between the pulser and the load (gas discharge). The respective source of pre-pulse (134 and 136 in FIG. 1) can be protected using a combination of a pre-pulse inductor ($L_{PP}$ and $L_{PP}'$) and a pre-pulse capacitor ($C_{PP}$ and $C_{PP}'$) As a result, the voltage drop at the output of the magnetization pre-pulse source during a positive half-wave of the $V_{C2}$ can be minimal and safe.

In a MOPA laser system example based on a principle of relative delay adjustment as described above, the source of magnetization pre-pulse can be controlled by an electronic synchronization control unit or a laser control computer module. A synchronization control unit can operate using a combination of at least two control algorithms, including open-loop and closed-loop control algorithms. A closed-loop algorithm can accept as input the data of the delay of several pulses, and can use this data to predict a delay for a subsequent pulse, such as by using extrapolation. This can be based, for example, on a common PID control algorithm as known in the art. Such an algorithm can have a limited time resolution equal to the time required to accumulate data for several pulses, but can be quite accurate. An open-loop algorithm can operate on a single-pulse basis, and can make a prediction based on prior experience with the pulse delay tendency, such as in the beginning of the burst. Such an algorithm can be said to be a "learning" algorithm, since the algorithm can update an associated database or look-up table(s) for each burst. A potential downside to an open-loop algorithm is that the open loop algorithm typically will not be as accurate as a closed-loop algorithm, and can require the firing of several bursts before generating useful output.

After receiving a trigger pulse from the application process, the syncronization control unit can send a trigger pulse to the source of magnetization pre-pulse, and can send the main trigger pulse to the solid state switch in the compressor. Generally speaking the main trigger pulse will occur at a predetermined time after receiving the trigger pulse for the application process, and the timing of the magnetization pre-pulse relative to the trigger of the application process will be used to vary the output relative timing between the different channels. Assuming the pre-pulse extends beyond the main pulse, the length of pre-pulse $\tau_{pp}$ can be adjusted, and, thus, the amount of flux content removed by the pre-pulse. This, in turn, can vary the delay of the compressed pulse in the oscillator channel as explained above.

Figure 3:
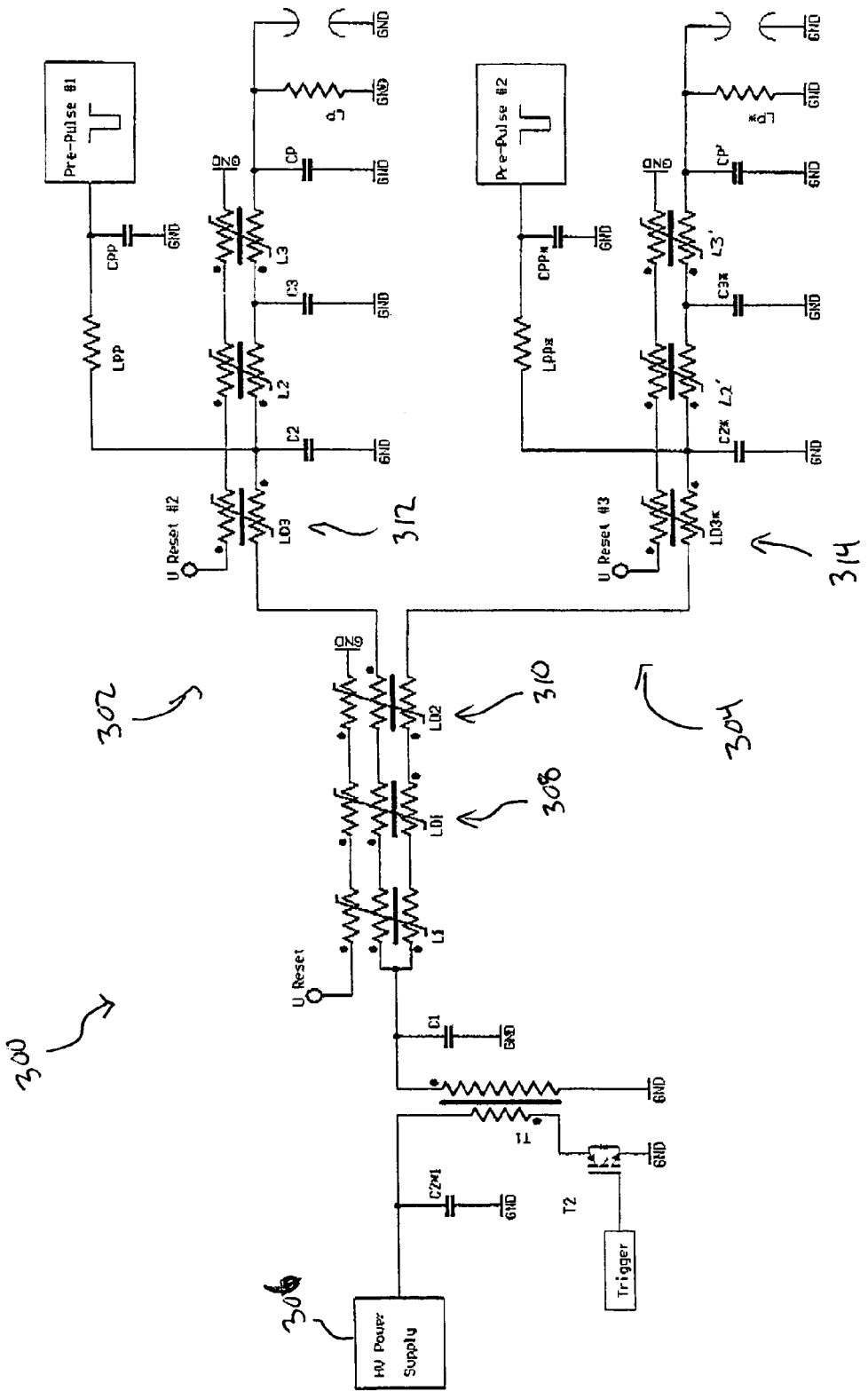
FIG. 3 is an electrical diagram of a discharge circuit in accordance with another embodiment of the present invention.

A discharge circuit 300 in accordance with another embodiment of the present invention is illustrated in FIG. 3. This exemplary circuit again includes two channels, such as a channel 302 for a master oscillator and a channel 304 for a power amplifier of a MOPA system, utilizing a common power supply 306, main pulse trigger, and initial compression stage, as decribed with respect to FIG. 1. In this embodiment, however, diodes are not used to decouple the pre-pulse circuitry from the main pulse. Instead, additional saturable inductors are used, including saturable inductors $LD_1$ 308 and $LD_2$ 310, which are common to both channels, and inductors $LD_3$ 312 and $LD_3'$ 314 for the MO and PA channels, respectively. An advantage to using these additional saturable inductors is that these inductors act as "magnetic diodes" to prevent flow of electrical charge between $C_2$ and $C_2'$. The saturable inductors $LD_1$ 308 and $LD_2$ 310 can be constructed such that the have two windings in opposing directions. Current can flow through these inductors to the respective MO and PA channels, but these inductors will operate to provide a very high impedance to block current from flowing between the capacitors $C_2$ and $C_2$. Additionally, the inductors LD1 and LD2 can be constructed such that they operate to pass an balanced amount of current to both of the branches, and where the current of one branch exceeds the current of the other branch, the configurations of the windings is such that an increasing amount impedance is created by virtue of the opposite orientation of the windings. Thus, in one embodiment LD1 and LD2 can be used to provide balanced current flow to the branches.

In one embodiment the magnetic diodes LD1 and LD2 consist of a saturable magnetic core with two anti-parallel winding and a reset winding. The reset winding ensures that the core of the magnetic diode is saturated is a defined direction. Current flowing through the diodes will encounter low inductance, if the current is balanced between the two windings. Any unbalanced current will encounter high inductance, if it flows in non-saturated direction of the magnetic diode. Thus, the unbalanced current is held off for a time duration, which is determined by the V*t product of the diode. However, in the saturated direction unbalanced current will encounter low inductance. Therefore, two diodes LD1 and LD2 are connected in series, with the reset winding connected so the diodes are saturated in opposing direction. Thus, any unbalanced current will encounter high inductance, either in LD1 or LD2. The V*t product of LD1 and LD2 is adjusted so it holds off both the pre-pulse and also prevents charge transfer from C2 to C2* (or C2* to C2).

The magnetic reset windings of $LD_3$ and $LD_3'$ are in a direction that is opposite to that of $L_2$, $L_3$, $L_{2'}$, and $L_{3'}$, such that $LD_3$ and $LD_3'$ present very small inductance for the main current pulse that transfers charge from $L_1$ to $L_2$ and $L_{2'}$. At the same time, the magnetic flux content of $LD_3$ and $LD_3'$ can be selected such that the hold-off time of those inductors exceeds a maximum relative delay between the breakdown in $L_2$ and $L_{2'}$, and can present a high impedance for the flow of charge between $L_2$ and $L_{2'}$. An advantage to using such "magnetic diodes" over conventional semiconductor diodes such as those described with respect to FIG. 1 is that the magnetic diodes can be much more reliable under high-voltage, high peak-current conditions.

Figure 4:
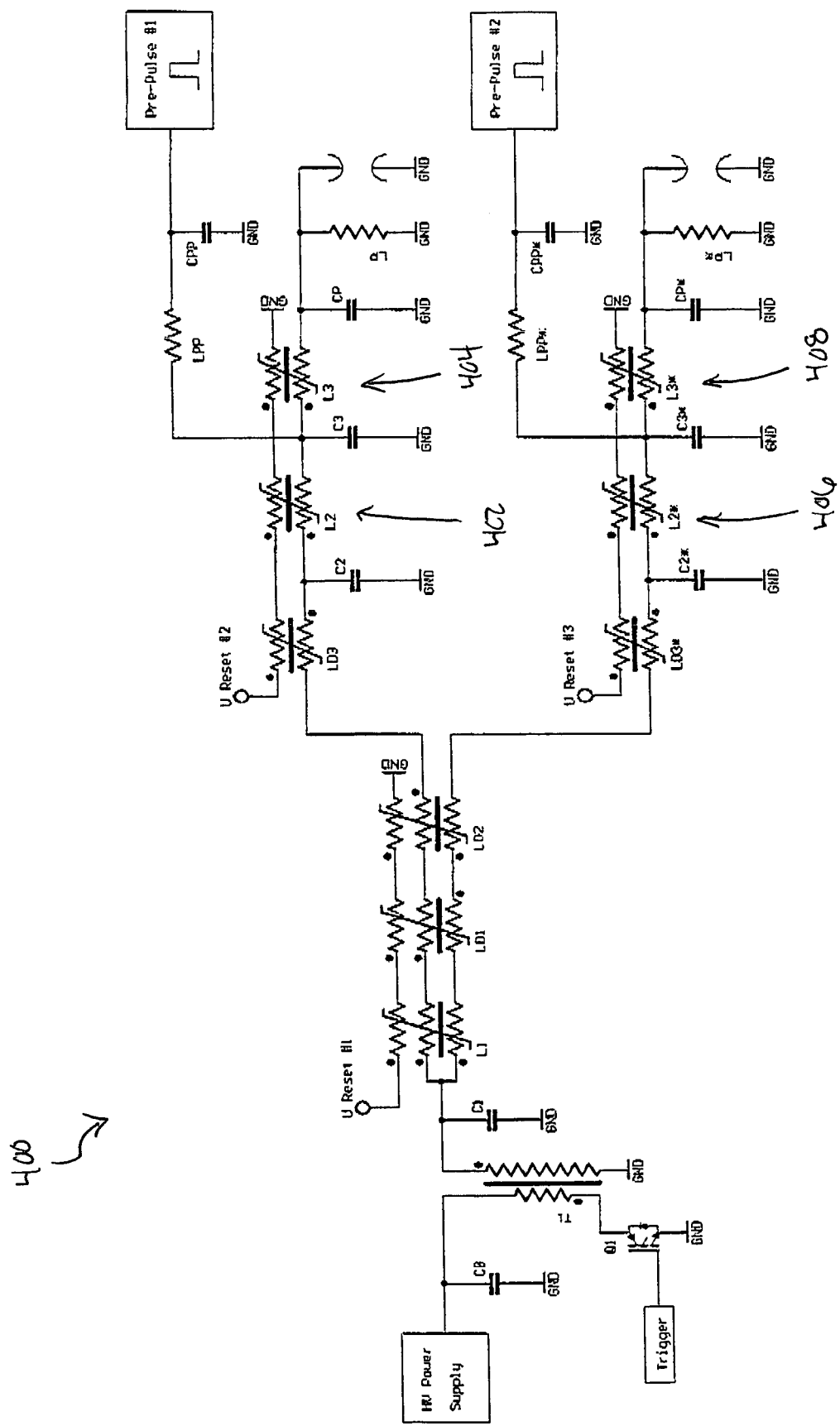
FIG. 4 is an electrical diagram of a discharge circuit in accordance with another embodiment of the present invention.
Figure 5:
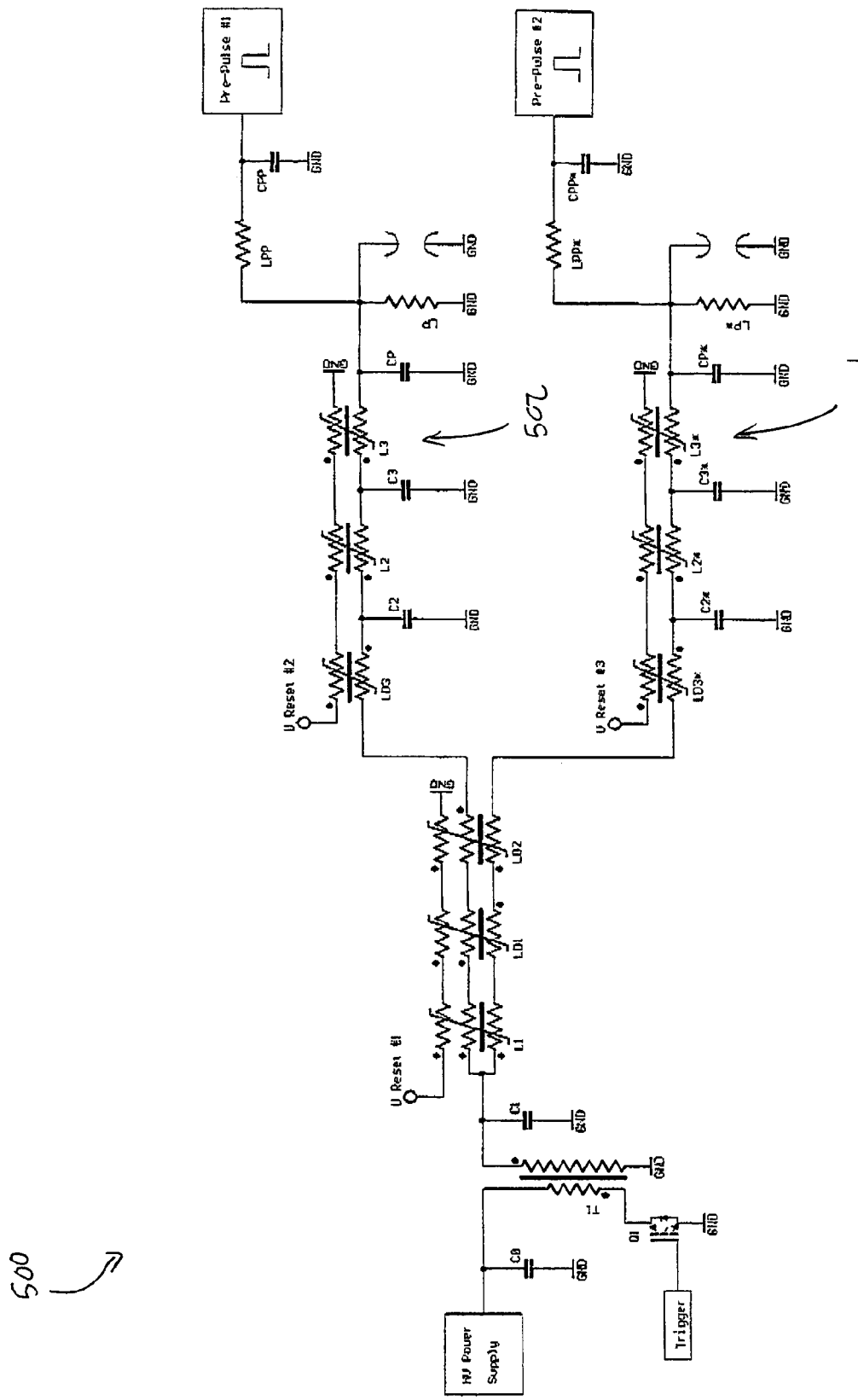
FIG. 5 is an electrical diagram of a discharge circuit in accordance with another embodiment of the present invention.

Two alternative embodiments of a discharge circuit including pre-pulse circuitry are shown in FIGS. 4 and 5. These embodiments differ in the application point of the pre-pulse. In the circuit 400 of FIG. 4, for example, the pre-pulse is applied between $L_2$ 402 and $L_3$ 404 (or $L_2'$ 406 and $L_3'$ 408). In the circuit 500 of FIG. 5, the pre-pulse is applied at the output of $L_3$ 502 (or $L_3'$ 504). It can be desirable to apply the magnetization pre-pulse as late in the compression process as possible, in order to obtain a maximum effectiveness of the pre-pulse. In many systems, however, the physical configuration of the laser system can prevent the application of a prepluse after $L_3$, for example, such that applying the pre-pulse between $L_2$ and $L_3$ might strike a reasonable balance for many systems. The resulting magentization current in these embodiments flows generally through all the saturable inductors in the circuit. However, the effect of the applied voltage depends on the characteristics of the inductor; for example, the effect of a resulting current depends on the sign of the current with respect to the sign of reset current, and the polarity and number of windings for the inductor. For example, if a positive pre-pulse is applied in the circuit of FIG. 4 by pre-pulse circuit #1, the magnetization of cores in inductor $L_2$ is reduced, whereas for $L_3$ the pre-pulse voltage is of opposite polarity relative to inductor $L_2$ and thus the magnetization of the cores of L3 is not changed by the prepulse voltage. The cores of $L_1$, $L_2'$, and $L_3'$ do not experience a change of magnetization, however, as these inductors already have been saturated in the direction of pre-pulse current. This leads to a reduction of the delay in the channel containing $C_2$, $L_2$, $C_3$, and $L_3$.

The circuit 500 of FIG. 5 is different than the circuit 400 of FIG. 4 in that the pre-pulse voltage is applied at the peaking capacitors. The operation of the circuit 500 is similar to 400, but some differences are illustrated by considering the application of the pre-pulse voltage #1. In the embodiment shown in FIG. 5, application of this pre-pulse voltage will create a current through both $L_2$ and $L_3$. The magnitude of this current is determined by the characteristics of the $L_2$ and not $L_3$. This is because as constructed $L_2$ has a much lower coercive current than $L_3$. One way to achieve this difference in the coercive current is to provide $L_2$ with significantly more windings around the core than are provided in L3. Thus, while the magnitude of the current is the same in both $L_2$ and $L_3$, the current operates to change the flux in $L_2$, but does not significantly effect the flux of $L_3$.

Inductors $L_{PP}$ and $L_{PP}'$ can be used to protect the respective source of pre-pulse from the voltage pulse of the main discharge. The inductance value of $L_{PP}$ and $L_{PP}'$ can be selected so as to provide low resistance for the relatively long "pre-pulse," but present high impedance for a short pulse of main discharge. The circuit 500 shown in FIG. 5 can provide an advantagous characteristic, in that the duration of the pulse of the main discharge is a very short time span, so the inductors Lpp and Lpp' need only provide a very short hold off time to protect against the main pulse be applied to the voltage rpe-pulse supply.

In one embodiment a typical value for LPP in FIG. 4 is 100 µH. In another embodiment for the circuit of FIG. 3 the value of LPP is about 20 mH, 20 times larger than LPP in FIG. 4. In FIG. 5 the required inductance for LPP would be less than 30 µH. It has to be noted that the inductance values are determined by the charge allowed to be transferred from C2, C3 or CP to CPP. Only a fraction of a percent of the total charge stored in C2, C3 or CP should be transferred to CPP. Thus, high inductance for LPP is desired. At the same time, the inductance of LPP should be low enough, so the pre-pulse is not blocked. It can be seen that from this point the schematics of FIGS. 4 and 5 have certain advantages over FIG. 3, since lower inductance values for LPP are required.

Preferably, inductor $L_1$ comprises two identical windings, each winding being connected to the respective channel. This connection approach is described, for example, in U.S. patent application Ser. No. 10/699,763, incorporated herein by reference above. These windings help to de-couple the channels once the core of $L_1$ saturates. At the same time, having a common core for the two windings of $L_1$ can help to ensure simultaneous resonant charge transfer to capacitors $C_2$ and $C_2'$.

In the circuits of FIGS. 1 and 3-5, it can be seen that a pre-pulse can be applied to either or both of the channels. The pre-pulses for the two channels can be of the same or opposite sign. Moreover, there may be several pre-pulse sources in the same circuit that are applied to the outputs of $L_3$ and $L_3'$, and/or between $L_2$ and $L_3$, and/or between $L_2'$ and $L_3'$. The total effect of all the pre-pulses on the relative delay can be approximately the additive sum of the effects of individual pre-pulses.

An advantage to using two pre-pulse sources instead of a single pre-pulse source is that the range of achievable relative delays can be increased by approximately a factor of two. When a pre-pulse is applied to the MO channel from a first pre-pulse source, for example, the output pulse in the MO channel is delayed with respect to the trigger pulse, and with respect to the output of the PA channel. Similarly, applying pre-pulse to the PA channel delays the PA channel output, effectively decreasing the relative delay of the MO channel. This can be particularly useful when a large delay variation in a single channel is problematic, such as may be due to a non-linear delay dependence on the pre-pulse length or amplitude.

As discussed above, the delay can be controlled in one embodiment through an adjustment of the control flux content of inductor $L_2$. In an exemplary system, inductor $L_2$ has a hold-off time of roughly 0.8 microseconds for a voltage pulse of 30 kV. Assuming a nearly triangular shape of the voltage pulse, this would lead to flux content of approximately 12 µsec-kV. It can be desirable in such an embodiment to modify the hold-off time of inductor $L_2$ by up to approximately 30 nsec, which can require removing a small portion, such as less than 4%, of the maximum flux content of inductor $L_2$. Such an approach can ensure that performance parameters of the pulser are not compromised. The small portion of flux content can be removed using a relatively low voltage pulse of 100 V, applied for less than 5 µsec. In practice, however, a 100V supply source can produce somewhat lower voltage at inductor $L_2$, due to the voltage drop in other components of the pre-pulse circuit. A pre-pulse of less than 10 to 30 µsec still can be sufficient, however, which is much shorter than the time between pulses, which can be on the order of 250 µsec at 4 kHz. The pre-pulse therefore does not disturb operation of the reset circuit, and the reset circuit does not affect the pre-pulse. At the same time, the pre-pulse can be much longer than the main compressed pulse, which can be on the order of about 0.8 µsec, such that the pre-pulse circuit can be effectively de-coupled using inductors LPP or LPP'.

Figure 7:
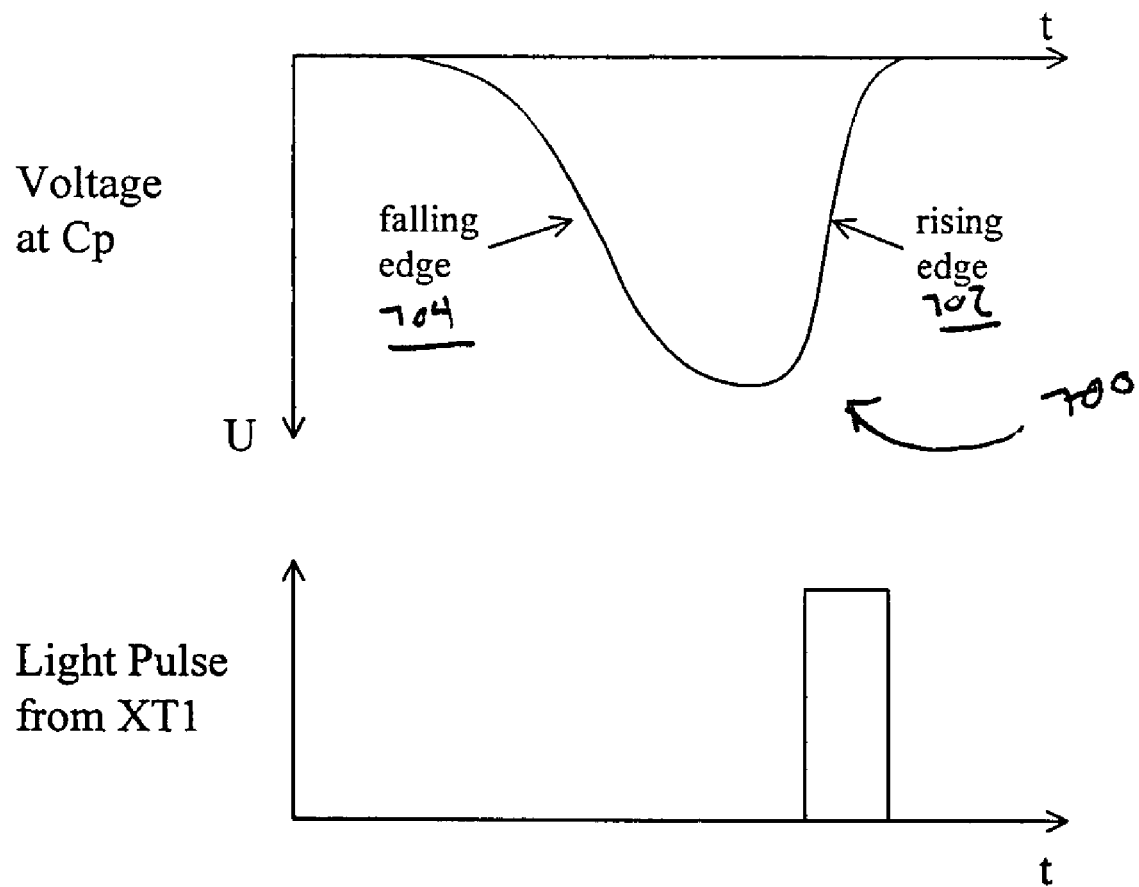
FIG. 7 is a timing diagram of a high voltage pulse and light pulse corresponding to the timing transmitter circuit of FIG. 6.

A high voltage pulse 700 applied to the discharge chambers will typically have a rising edge 702 and a falling edge 704, as shown for example in FIG. 7. The falling edge is indicative of the charging of the discharge chamber capacitors, while the rising edge is indicative of the discharge, which is directly linked to the evolution of the gain. It therefore can be desirable to measure the timing of the rising edge, as measuring the falling edge may not be useful since the delay between falling and rising edges can change.

Figure 6:
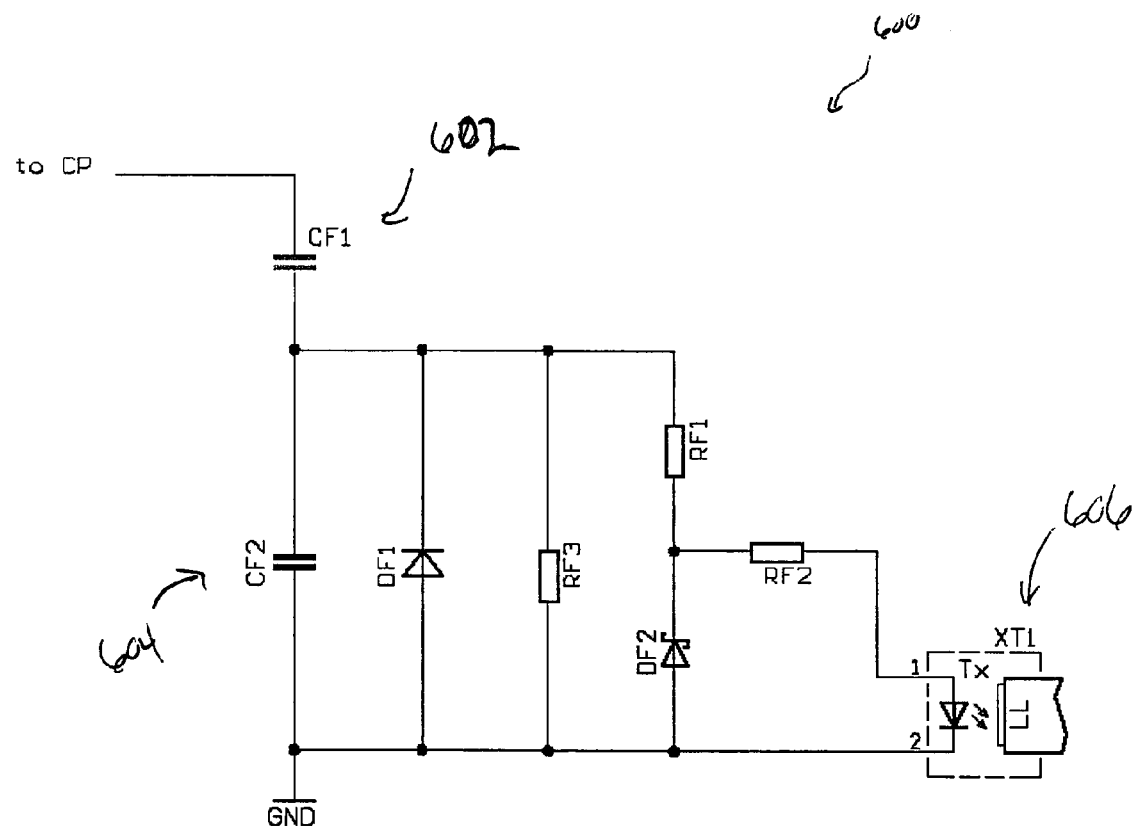
FIG. 6 is an electrical diagram of a timing transmitter circuit that can be used with the discharge circuits of FIGS. 1 and 3-5.

A timing transmitter circuit 600 as is shown in FIG. 6 can be used to control such timing. A voltage due to the presence of a pulse portion in one of the channels can be applied to a peaking capacitor (such as $C_P$ in FIG. 5), which can function to provide a timing of the pulse in that channel. The timing transmitter circuit then can generate an optical signal in response to receiving the timing pulse, and can transmit the optical signal through an optical fiber, such as to a synchronization module for monitoring and adjusting pulse timing. In this exemplary circuit 600, capacitors $CF_1$ 602 and $CF_2$ 604 function as a capacitive voltage divider. The capacity of $CF_1$ in this example is about 100 pF, while the capacity of $CF_2$ is about 10,000 nF. Across capacitor $CF_2$ the voltage is about $\frac{1}{100}^{th}$ of the voltage applied to $CF_1$. As an example, a voltage of 20,000V applied to $CF_1$ will result in a voltage of 200V across $CF_2$. The voltage across $CF_2$ then can drive a current through $RF_1$, $RF_2$, and $XT_1$ 606. $XT_1$ 606 is an optical transmitter capable of generating a light pulse, while resistors $RF_1$ and $RF_2$ can be used to limit the current. Without diode $DF_1$, this circuit would require a positive voltage, instead of the negative voltage pulse applied to $CF_1$. $CF_1$ is charged during the falling edge portion of the high voltage pulse, but the voltage across $CF_2$ stays lower than expected from the dividing ratio. Since $DF_1$ is conducting for a negative voltage, full charging of $CF_2$ is prevented. Diode $DF_1$ can become non-conductive again once the voltage begins to rise again. A positive voltage then can build up across $CF_2$, such that transmitter $XT_1$ emits a light pulse. Only the first leading edge of the light pulse is taken for measuring the timing in this embodiment, such that the shape of the optical pulse does not affect the measurements. Resistor $RF_3$ can be used to completely discharge capacitors $CF_1$ and $CF_2$ between high voltage pulses. Diode $DF_2$ can serve as protection for $XT_1$. Further, the use of the optical transmitter $XT_1$ provides for use of a detection device which is galvanically decoupled from the discharging of the peaking capacitor $C_p$.

While a magnetization pre-pulse voltage can be used to control the timing between discharge chambers, this approach can be considered a relatively coarse adjustment in certain situations. In order to provide a fine tuning of the relative timing, a pre-ionization control also can be used, such as is described in U.S. patent application Ser. No. 10/776,137, entitled "EXCIMER OR MOLECULAR FLUORINE LASER WITH SEVERAL DISCHARGE CHAMBERS," which is hereby incoporated herein by reference. The additional pre-ionization circuitry can be used to take care of any remaining, un-compensated jitter. This additional control can be especially important in the beginning of a burst, where the accuracy of an open-loop algorithm can be insufficient to compensate for jitter to below 1 nsec. The timing of discharge can be locked to the pre-ionization pulse, which can be generated by a dedicated high voltage pulse source that, since it is low-power, can be synchronized to the trigger pulse with high accuracy.

Further, the pre-ionization can be used to provide a finer control for various systems. For example, in one embodiment a 50 ns pulse delay can be adjusted by +/−30 ns or less using the pre-pulse voltage to control capacitor flux as described above. If a tighter control is necessary, the pre-ionization energy can be used to adjust the pulse on the order of +/−5 ns or less. In such an embodiment, 5 ns can be set as an adjustment threshold value, such that when a synchonization unit determines that an adjustment of more than 5 ns needs to be made, the syncrhonization unit can send an adjustment signal to one of the magnetic pre-pulse sources. If an adjustment that is less than the threshold value, here less than 5 ns, needs to be made, the syncrhonization unit can direct at least one of the pre-ionization sources to adjust the relative timing.

In a discharge circuit such as that shown in FIGS. 1 and 3-5, the exact number of compressor stages, as well as at the stage at which the separation of channels begins, can vary. The choice can be dependent upon several design parameters, such as the rise-time of the solid-state switch, the achievable compression ratio of each stage, the required risetime of the cathode voltage, and so on. The exemplary three stage configuration described here is merely representative of the variety of possible configurations. It should be understood that the number and configuration of the stages and separation can vary based on the embodiment, but generally can involve common stages up to the point where the becomes sufficiently small, there is sufficient de-coupling of loads in each channel, and the peak current is low enough to permit use of diodes where desired.

Figure 8:
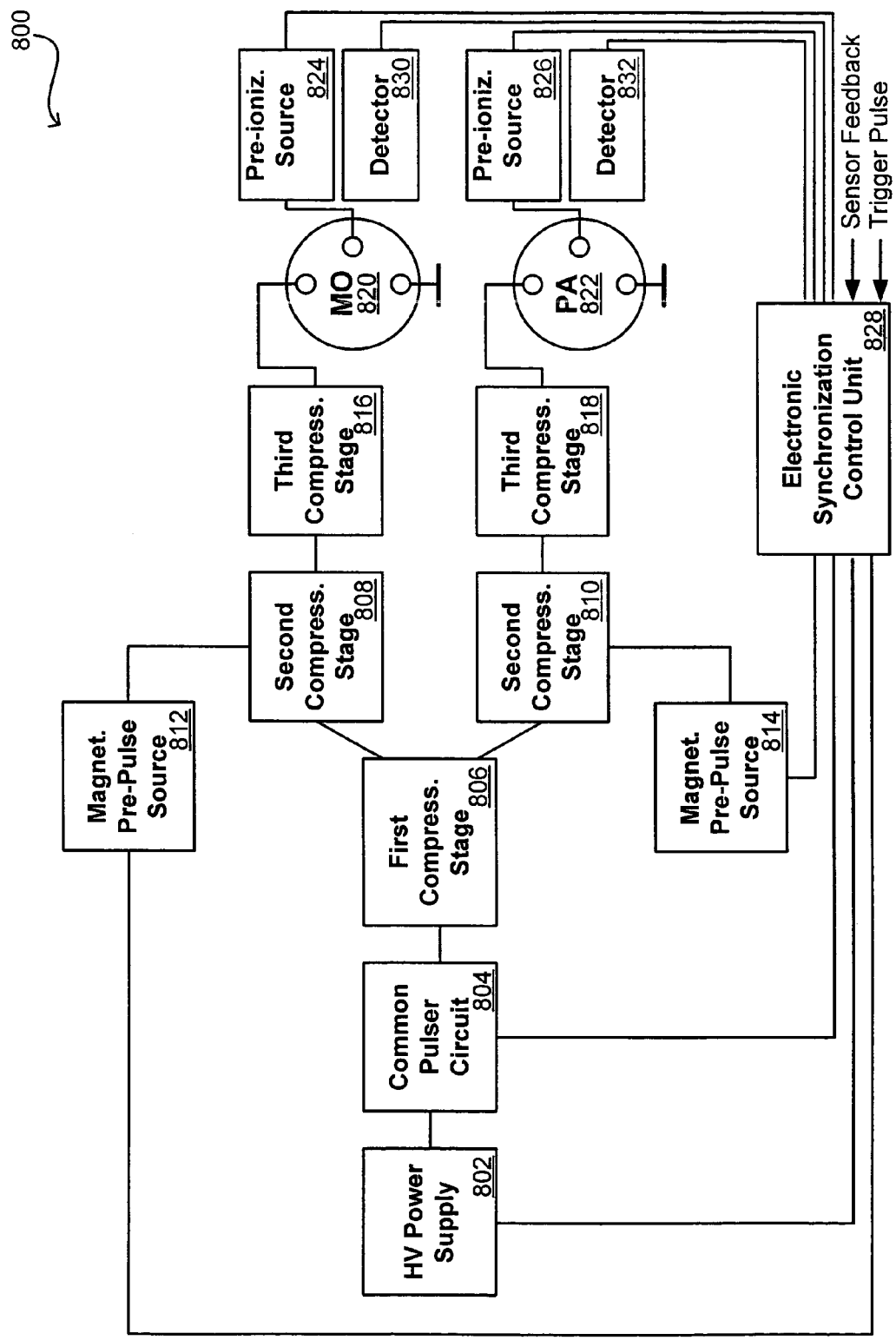
FIG. 8 is a diagram of an overall laser system that can be used with the discharge circuits of FIGS. 1 and 3-5.

FIG. 8 schematically illustrates an exemplary dual-chamber laser system 800 that can be used in accordance with various embodiments of the present invention. The laser system shown is in a MOPA configuration as discussed above, having both a master oscillator 820 and power amplifier 822. In the laser system 800, a high voltage power supply 802 can be used to charge at least one capacitor in the common pulser circuit 804, which then can provide a main voltage pulse to the first compression stage 806, which is common for both the MO channel and the PA channel. There may be multiple initial compression stages that are common to both channels, as discussed above.

While both channels can utilize a common first compression stage 806, there can be separate compression branches for each channel, with each branch including at least one final compression stage (808 and 810 for the MO branch, 816 and 818 for the PA branch). In the example of FIG. 8, each third compression stage 816, 818 can be loaded onto the respective discharge chamber 820, 822. Using common components for the two channels up to the compression branches can help to minimize the relative time delay and/or time jitter between the channels. At the same time, separate final compressor stages can be utilized in order to de-couple the discharge chambers. Such de-coupling in principle can be done using diodes (not shown), but the high peak current and voltage values in the final stages can preclude such a solution. As such, the diodes can be placed at earlier compression stages where the peak current magnitude is still relatively moderate.

Figure 9:
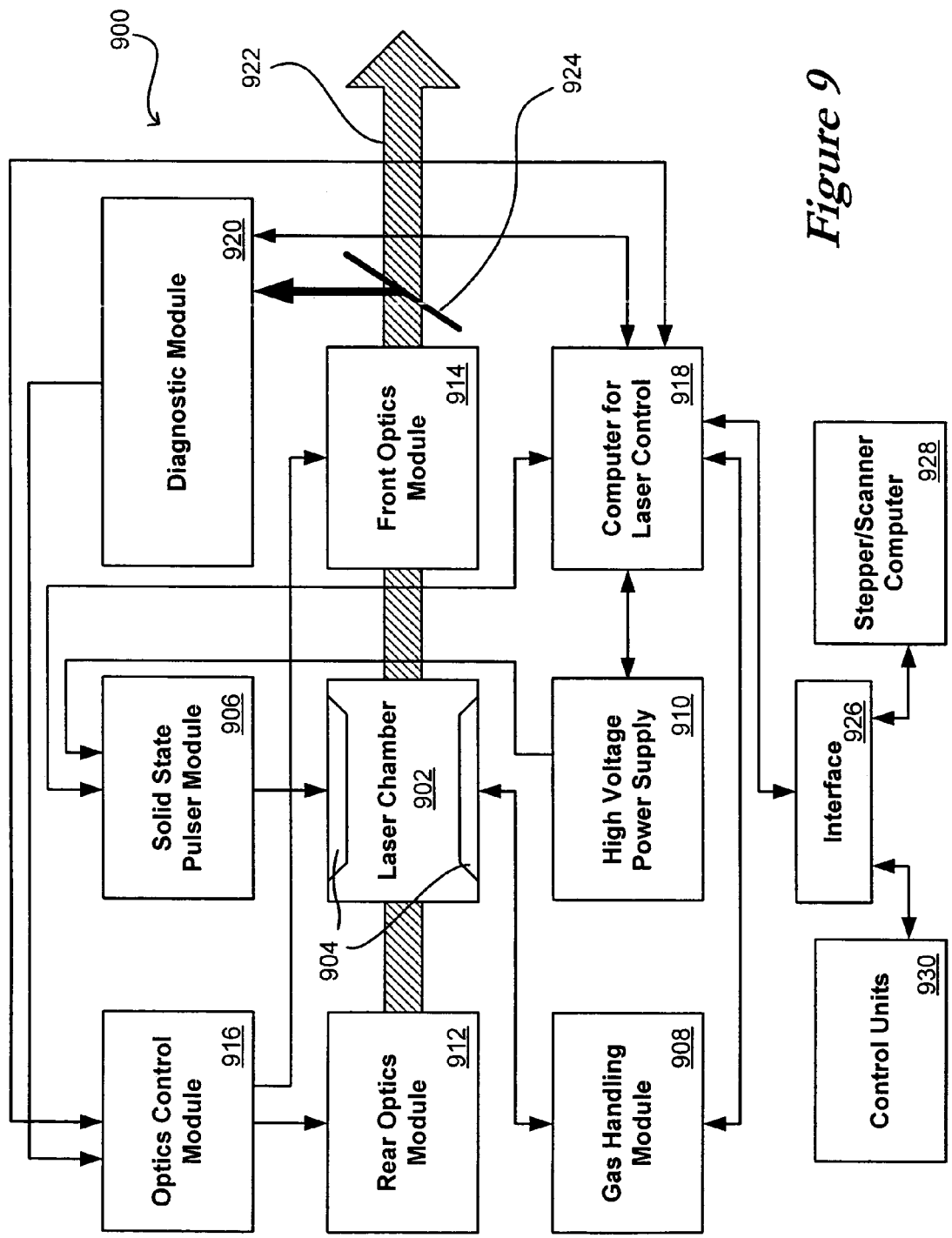
FIG. 9 is a diagram of an overall laser system that can be used with the discharge circuits of FIGS. 1 and 3-5.

Each channel also can have a separate source of magnetization pre-pulse voltage 812, 814 applied at a location as described above. Each channel also can have a pre-ionization source 824, 826, which can include a pre-ionization voltage source and a pre-ionization electrode or pre-ionization pins in the discharge chamber, which can be used for fine-tuning of the discharge timing as described above. Each channel also can have at least one detector 830, 832 for generating a detection signal corresponding to a discharge in a respective discharge chamber 820, 822. The detection signal can represent a timing voltage being applied to a discharge chamber, a discharging of electrodes in a discharge chamber, an emission of light from a discharge chamber, or any other reasonable event from which timing can be obtained. Each source of magnetization pre-pulse voltage and/or pre-ionization can be controlled by an electronic synchronization control unit 828 or a laser control computer module (as shown in FIG. 9). A synchronization control unit can operate using an open loop control algorithm, a closed-loop control algorithm, or a combination of open-loop and closed-loop control algorithms, such as discussed above. A closed-loop algorithm can accept as input the data of the delay of several pulses, the timing of the discharges, the timing of the emissions, and/or any of a number of other system variables and signals. This information can be used to predict a necessary delay for a subsequent pulse and/or to adjust the system parameters. For example, a change in delay can be procsessed by the electronic synchonization unit, such that the synchronization unit can change the timing and/or voltage of at least one of the magnetic pre-pulse sources, change the timing of the pre-ionization sources, and/or change the timing of the main pulse discharge relative to the receipt of a trigger pulse. As discussed above, the deterination of which changes are to be made can be determined by the length of the necessary delay change, such as whether the delay change exceeds an adjustment threshold value. An open-loop algorithm can operate on a single-pulse basis, using the same information as captured for the closed-loop algorithm but only for a single main pulse, and can make a prediction based on prior experience and/or programmed adjustments.

After receiving a trigger pulse from an application process or other external trigger source, the syncronization control unit 828 can send a trigger pulse to the source of magnetization pre-pulse, and can send the main trigger pulse to a solid state switch in the common pulser circuit 804. By varying the delay between the magnetization pre-pulse and the main trigger pulse, assuming the pre-pulse extends beyond the main pulse, the length of pre-pulse can be adjusted, which can vary the delay of the compressed pulse in the oscillator channel as explained above.

FIG. 9 schematically illustrates an exemplary excimer or molecular fluorine laser system 900 that can be used in accordance with various embodiments of the present invention. The gas discharge laser system can be a deep ultraviolet (DUV) or vacuum ultraviolet (VUV) laser system, such as an excimer laser system, e.g., ArF, XeCl or KrF, or a molecular fluorine ($F_2$) laser system for use with a DUV or VUV lithography system. Alternative configurations for laser systems, for use in such other industrial applications as TFT annealing, photoablation and/or micromachining, e.g., include configurations understood by those skilled in the art as being similar to, and/or modified from, the system shown in FIG. 9 to meet the requirements of that application.

The laser system 900 includes a laser chamber 902 or laser tube, which can include a heat exchanger and fan for circulating a gas mixture within the chamber or tube. The chamber can include a plurality of electrodes 904, such as a pair of main discharge electrodes and one or more ionization electrodes or elements which can be connected with a solid-state pulser module 906, or with separate modules or circuitry as described elsewhere herein. A gas handling module 908 can have a valve connection to the laser chamber 902, such that halogen, rare and buffer gases, and gas additives, can be injected or filled into the laser chamber, such as in premixed forms for ArF, XeCl and KrF excimer lasers, as well as halogen, buffer gases, and any gas additive for an $F_2$ laser. The gas handling module 908 can be preferred when the laser system is used for microlithography applications, wherein very high energy stability is desired. A gas handling module can be optional for a laser system such as a high power XeCl laser. A solid-state pulser module 906 can be used that is powered by a high voltage power supply 910. Alternatively, a thyratron pulser module can be used. The laser chamber 902 can be surrounded by optics modules 912, 914, forming a resonator. The optics modules 912, 914 can include a highly reflective resonator reflector in the rear optics module 912, and a partially reflecting output coupling mirror in the front optics module 914. This optics configuration can be preferred for a high power XeCl laser. The optics modules 912, 914 can be controlled by an optics control module 916, or can be directly controlled by a computer or processor 918, particularly when line-narrowing optics are included in one or both of the optics modules. Line-narrowing optics can be preferred for systems such as KrF, ArF or $F_2$ laser systems used for optical lithography.

The processor 918 for laser control can receive various inputs and control various operating parameters of the system. A diagnostic module 920 can receive and measure one or more parameters of a split off portion of the main beam 922 via optics for deflecting a small portion of the beam toward the module 920. These parameters can include pulse energy, average energy and/or power, and wavelength. The optics for deflecting a small portion of the beam can include a beam splitter module 924. The beam 922 can be laser output to an imaging system (not shown) and ultimately to a workpiece (also not shown), such as for lithographic applications, and can be output directly to an application process. Laser control computer 918 can communicate through an interface 926 with a stepper/scanner computer, other control units 928, 930, and/or other, external systems.

The processor or control computer 916 can receive and process parameter values, such as may include the pulse shape, energy, ASE, energy stability, energy overshoot (for burst mode operation), wavelength, spectral purity, and/or bandwidth, as well as other input or output parameters of the laser system and/or output beam. The processor can receive signals corresponding to the wavefront compensation, such as values of the bandwidth, and can control wavefront compensation, performed by a wavefront compensation optic in a feedback loop, by sending signals to adjust the pressure(s) and/or curvature(s) of surfaces associated with the wavefront compensation optic. The processor 916 also can control the line narrowing module to tune the wavelength, bandwidth, and/or spectral purity, and can control the power supply 908 and pulser module 904 to control the moving average pulse power or energy, such that the energy dose at points on a workpiece is stabilized around a desired value. The laser control computer 916 also can control the gas handling module 906, which can include gas supply valves connected to various gas sources.

The laser chamber 902 can contain a laser gas mixture, and can include one or more ionization electrodes in addition to the pair of main discharge electrodes. The main electrodes can be similar to those described at U.S. Pat. No. 6,466,599 B1 (incorporated herein by reference above) for photolithographic applications, which can be configured for a XeCl laser when a narrow discharge width is not preferred.

The solid-state or thyratron pulser module 906 and high voltage power supply 910 can supply electrical energy in compressed electrical pulses to the ionization and/or main electrodes within the laser chamber 902, in order to energize the gas mixture. The rear optics module 912 can include line-narrowing optics for a line narrowed excimer or molecular fluorine laser as described above, which can be replaced by a high reflectivity mirror or the like in a laser system wherein either line-narrowing is not desired (XeCl laser for TFT annealling, e.g.), or if line narrowing is performed at the front optics module 914, or a spectral filter external to the resonator is used, or if the line-narrowing optics are disposed in front of the HR mirror, for narrowing the bandwidth of the output beam.

The laser chamber 902 can be sealed by windows transparent to the wavelengths of the emitted laser radiation 922. The windows can be Brewster windows, or can be aligned at an angle, such as on the order of about 5°, to the optical path of the resonating beam. One of the windows can also serve to output couple the beam.

After a portion of the output beam 922 passes the outcoupler of the front optics module 914, that output portion can impinge upon a beam splitter module 924 including optics for deflecting a portion of the beam to the diagnostic module 920, or otherwise allowing a small portion of the outcoupled beam to reach the diagnostic module 920, while a main beam portion is allowed to continue as the output beam 920 of the laser system. The optics can include a beamsplitter or otherwise partially reflecting surface optic, as well as a mirror or beam splitter as a second reflecting optic. More than one beam splitter and/or HR mirror(s), and/or dichroic mirror(s) can be used to direct portions of the beam to components of the diagnostic module 920. A holographic beam sampler, transmission grating, partially transmissive reflection diffraction grating, grism, prism or other refractive, dispersive and/or transmissive optic or optics can also be used to separate a small beam portion from the main beam 922 for detection at the diagnostic module 920, while allowing most of the main beam 922 to reach an application process directly, via an imaging system or otherwise.

The output beam 922 can be transmitted at the beam splitter module, while a reflected beam portion is directed at the diagnostic module 920. Alternatively, the main beam 922 can be reflected while a small portion is transmitted to a diagnostic module 920. The portion of the outcoupled beam which continues past the beam splitter module can be the output beam 922 of the laser, which can propagate toward an industrial or experimental application such as an imaging system and workpiece for photolithographic applications.

For a system such as a molecular fluorine laser system or ArF laser system, an enclosure (not shown) can be used to seal the beam path of the beam 922 in order to keep the beam path free of photoabsorbing species. Smaller enclosures can seal the beam path between the chamber 902 and the optics modules 912 and 914, as well as between the beam splitter 924 and the diagnostic module 920.

The diagnostic module 920 can include at least one energy detector to measure the total energy of the beam portion that corresponds directly to the energy of the output beam 922. An optical configuration such as an optical attenuator, plate, coating; or other optic can be formed on or near the detector or beam splitter module 924, in order to control the intensity, spectral distribution, and/or other parameters of the radiation impinging upon the detector.

A wavelength and/or bandwidth detection component can be used with the diagnostic module 920, the component including for example such as a monitor etalon or grating spectrometer. Other components of the diagnostic module can include a pulse shape detector or ASE detector, such as for gas control and/or output beam energy stabilization, or to monitor the amount of amplified spontaneous emission (ASE) within the beam, in order to ensure that the ASE remains below a predetermined level. There can also be a beam alignment monitor and/or beam profile monitor.

The processor or control computer 918 can receive and process values for the pulse shape, energy, ASE, energy stability, energy overshoot for burst mode operation, wavelength, and spectral purity and/or bandwidth, as well as other input or output parameters of the laser system and output beam. The processor 918 also can control the line narrowing module to tune the wavelength and/or bandwidth or spectral purity, and can control the power supply 910 and pulser module 906 to control the moving average pulse power or energy, such that the energy dose at points on the workpiece can be stabilized around a desired value. In addition, the computer 918 can control the gas handling module 908, which can include gas supply valves connected to various gas sources. Further functions of the processor 918 can include providing overshoot control, stabilizing the energy, and/or monitoring energy input to the discharge.

The processor 918 can communicate with the solid-state or thyratron pulser module 906 and HV power supply 910, separately or in combination, the gas handling module 908, the optics modules 912 and/or 914, the diagnostic module 920, and an interface 926. The processor 918 also can control an auxiliary volume, which can be connected to a vacuum pump (not shown) for releasing gases from the laser tube 902 and for reducing a total pressure in the tube. The pressure in the tube can also be controlled by controlling the gas flow through the ports to and from the additional volume.

The laser gas mixture initially can be filled into the laser chamber 902 in a process referred to herein as a "new fill". In such procedure, the laser tube can be evacuated of laser gases and contaminants, and re-filled with an ideal gas composition of fresh gas. The gas composition for a very stable excimer or molecular fluorine laser can use helium or neon, or a mixture of helium and neon, as buffer gas(es), depending on the laser being used. The concentration of the fluorine in the gas mixture can range from 0.003% to 1.00%, in some embodiments is preferably around 0.1%. An additional gas additive, such as a rare gas or otherwise, can be added for increased energy stability, overshoot control, and/or as an attenuator. Specifically for a $F_2$-laser, an addition of xenon, krypton, and/or argon can be used. The concentration of xenon or argon in the mixture can range from about 0.0001% to about 0.1%. For an ArF-laser, an addition of xenon or krypton can be used, also having a concentration between about 0.0001% to about 0.1%. For the KrF laser, an addition of xenon or argon may be used also over the same concentration.

Halogen and rare gas injections, including micro-halogen injections of about 1-3 milliliters of halogen gas, mixed with about 20-60 milliliters of buffer gas, or a mixture of the halogen gas, the buffer gas, and a active rare gas, per injection for a total gas volume in the laser tube on the order of about 100 liters, for example. Total pressure adjustments and gas replacement procedures can be performed using the gas handling module, which can include a vacuum pump, a valve network, and one or more gas compartments. The gas handling module can receive gas via gas lines connected to gas containers, tanks, canisters, and/or bottles. A xenon gas supply can be included either internal or external to the laser system.

Total pressure adjustments in the form of releases of gases or reduction of the total pressure within the laser tube also can be performed. Total pressure adjustments can be followed by gas composition adjustments if necessary. Total pressure adjustments can also be performed after gas replenishment actions, and can be performed in combination with smaller adjustments of the driving voltage to the discharge than would be made if no pressure adjustments were performed in combination.

Gas replacement procedures can be performed, and can be referred to as partial, mini-, or macro-gas replacement operations, or partial new fill operations, depending on the amount of gas replaced. The amount of gas replaced can be anywhere from a few milliliters up to about 50 liters or more, but can be less than a new fill. As an example, the gas handling unit connected to the laser tube, either directly or through an additional valve assembly, such as may include a small compartment for regulating the amount of gas injected, can include a gas line for injecting a premix A including 1% $F_2$:99% Ne, and another gas line for injecting a premix B including 1% Kr:99% Ne, for a KrF laser. For an ArF laser, premix B can have Ar instead of Kr, and for a $F_2$ laser premix B may not be used. Thus, by injecting premix A and premix B into the tube via the valve assembly, the fluorine and krypton concentrations (for the KrF laser, e.g.) in the laser tube, respectively, can be replenished. A certain amount of gas can be released that corresponds to the amount that was injected. Additional gas lines and/or valves can be used to inject additional gas mixtures. New fills, partial and mini gas replacements, and gas injection procedures, such as enhanced and ordinary micro-halogen injections on the order of between 1 milliliter or less and 3-10 milliliters, and any and all other gas replenishment actions, can be initiated and controlled by the processor, which can control valve assemblies of the gas handling unit and the laser tube based on various input information in a feedback loop.

Line-narrowing features in accordance with various embodiments of a laser system can be used along with the wavefront compensating optic. For an $F_2$ laser, the optics can be used for selecting the primary line $\lambda_1$ from multiple lines around 157 nm. The optics can be used to provide additional line narrowing and/or to perform line-selection. The resonator can include optics for line-selection, as well as optics for line-narrowing of the selected line. Line-narrowing can be provided by controlling (i.e., reducing) the total pressure.

Exemplary line-narrowing optics contained in the rear optics module can include a beam expander, an optional interferometric device such as an etalon and a diffraction grating, which can produce a relatively high degree of dispersion, for a narrow band laser such as is used with a refractive or catadioptric optical lithography imaging system. As mentioned above, the front optics module can include line-narrowing optics as well.

Instead of having a retro-reflective grating in the rear optics module, the grating can be replaced with a highly reflective mirror. A lower degree of dispersion can be produced by a dispersive prism, or a beam expander and an interferometric device such as an etalon. A device having non-planar opposed plates can be used for line-selection and narrowing, or alternatively no line-narrowing or line-selection may be performed in the rear optics module. In the case of an all-reflective imaging system, the laser can be configured for semi-narrow band operation, such as may have an output beam linewidth in excess of 0.5 pm, depending on the characteristic broadband bandwidth of the laser. Additional line-narrowing of the selected line can then be avoided, instead being provided by optics or by a reduction in the total pressure in the laser tube.

For a semi-narrow band laser such as is used with an all-reflective imaging system, the grating can be replaced with a highly reflective mirror, and a lower degree of dispersion can be produced by a dispersive prism. A semi-narrow band laser would typically have an output beam linewidth in excess of 1 pm, and can be as high as 100 pm in some laser systems, depending on the characteristic broadband bandwidth of the laser.

The beam expander of the above exemplary line-narrowing optics of the rear optics module can include one or more prisms. The beam expander can include other beam expanding optics, such as a lens assembly or a converging/diverging lens pair. The grating or a highly reflective mirror can be rotatable so that the wavelengths reflected into the acceptance angle of the resonator can be selected or tuned. Alternatively, the grating, or other optic or optics, or the entire line-narrowing module, can be pressure tuned. The grating can be used both for dispersing the beam for achieving narrow bandwidths, as well as for retro-reflecting the beam back toward the laser tube. Alternatively, a highly reflective mirror can be positioned after the grating, which can receive a reflection from the grating and reflect the beam back toward the grating in a Littman configuration. The grating can also be a transmission grating. One or more dispersive prisms can also be used, and more than one etalon can be used.

Depending on the type and extent of line-narrowing and/or selection and tuning that is desired, and the particular laser that the line-narrowing optics are to be installed into, there are many alternative optical configurations that can be used.

A front optics module can include an outcoupler for outcoupling the beam, such as a partially reflective resonator reflector. The beam can be otherwise outcoupled by an intra-resonator beam splitter or partially reflecting surface of another optical element, and the optics module could in this case include a highly reflective mirror. The optics control module can control the front and rear optics modules, such as by receiving and interpreting signals from the processor and initiating realignment or reconfiguration procedures.

The material used for any dispersive prisms, beam expander prisms, etalons or other interferometric devices, laser windows, and/or the outcoupler can be a material that is highly transparent at excimer or molecular fluorine laser wavelengths, such as 248 nm for the KrF laser, 193 nm for the ArF laser and 157 nm for the $F_2$ laser. The material can be capable of withstanding long-term exposure to ultraviolet light with minimal degradation effects. Examples of such materials can include $CaF_2$, $MgF_2$, $BaF2$, $LiF$, and $SrF_2$. In some cases fluorine-doped quartz can be used, while fused silica can be used for the KrF laser. Many optical surfaces, particularly those of the prisms, can have an anti-reflective coating, such as on one or more optical surfaces of an optic, in order to minimize reflection losses and prolong optic lifetime.

Various embodiments relate particularly to excimer and molecular fluorine laser systems configured for adjustment of an average pulse energy of an output beam, using gas handling procedures of the gas mixture in the laser tube. The halogen and the rare gas concentrations can be maintained constant during laser operation by gas replenishment actions for replenishing the amount of halogen, rare gas, and buffer gas in the laser tube for KrF and ArF excimer lasers, and halogen and buffer gas for molecular fluorine lasers, such that these gases can be maintained in a same predetermined ratio as are in the laser tube following a new fill procedure. In addition, gas injection actions such as μHIs can be advantageously modified into micro gas replacement procedures, such that the increase in energy of the output laser beam can be compensated by reducing the total pressure. In contrast, or alternatively, conventional laser systems can reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube.

Further stabilization by increasing the average pulse energy during laser operation can be advantageously performed by increasing the total pressure of gas mixture in the laser tube up to $P_{max}$. Advantageously, the gas procedures set forth herein permit the laser system to operate within a very small range around $HV_{opt}$, while still achieving average pulse energy control and gas replenishment, and increasing the gas mixture lifetime or time between new fills.

A laser system having a discharge chamber or laser tube with a same gas mixture, total gas pressure, constant distance between the electrodes and constant rise time of the charge on laser peaking capacitors of the pulser module, can also have a constant breakdown voltage. The operation of the laser can have an optimal driving voltage $HV_{opt}$, at which the generation of a laser beam has a maximum efficiency and discharge stability.

Variations on embodiments described herein can be substantially as effective. For instance, the energy of the laser beam can be continuously maintained within a tolerance range around the desired energy by adjusting the input driving voltage. The input driving voltage can then be monitored. When the input driving voltage is above or below the optimal driving voltage $HV_{opt}$ by a predetermined or calculated amount, a total pressure addition or release, respectively, can be performed to adjust the input driving voltage a desired amount, such as closer to $HV_{opt}$, or otherwise within a tolerance range of the input driving voltage. The total pressure addition or release can be of a predetermined amount of a calculated amount, such as described above. In this case, the desired change in input driving voltage can be determined to correspond to a change in energy, which would then be compensated by the calculated or predetermined amount of gas addition or release, such that similar calculation formulas may be used as described herein.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. An excimer or molecular fluorine laser system, comprising:
    first and second discharge chambers each being filled with a gas mixture, each of said first and second discharge chambers containing a pair of electrodes for energizing the gas mixture such that the first discharge chamber outputs an optical pulse and the second discharge chamber amplifies the optical pulse received from said first discharge chamber;
    a common pulser circuit operable to apply a common pulse;
    a first compression branch in electrical communication with the first discharge chamber and operable to receive the common pulse applied by the common pulser circuit, and in response to the common pulse the first compression branch being operable to transmit a first electrical pulse to said first discharge chamber to cause a first discharge in the first discharge chamber, said first compression branch including at least one inductor;
    a second compression branch in electrical communication with the second discharge chamber and operable to receive the common pulse applied by the common pulser circuit, and in response to the common pulse being operable to transmit a second electrical pulse to said second discharge chamber to cause a second discharge in the second discharge chamber; and
    a first control voltage source coupled to said first compression branch, the first control voltage source capable of applying a control voltage pre-pulse to said inductor of said first compression branch wherein the voltage level of the pre-pulse is substantially less than the voltage of the first electrical pulse supplied to the first discharge chamber and wherein the length of the pre-pulse is substantially longer than the first electrical pulse supplied to the first discharge chamber and wherein the voltage and length of the pre-pulse is selected to adjust the magnetic flux in the inductor in order to control a timing of the first discharge in the first discharge chamber.

2. A laser system according to claim 1, wherein:
    the first control voltage source is controlled to adjusting at least one of a voltage and duration of the control voltage being applied.

3. A laser system according to claim 1, further comprising:
    a second control voltage source coupled to said second compression branch, the second control voltage source capable of applying a control voltage to said second compression branch in order to control a timing of the second discharge in the second discharge chamber.

4. A laser system according to claim 3, wherein:
    the second control voltage source is a pre-pulse voltage source capable of applying a magnetic pre-pulse voltage to an inductor of said second compression branch in order to reduce a hold-off time of the inductor and thereby adjust the timing of the discharge in the second discharge chamber.

5. A laser system according to claim 3, wherein:
    one of said first and second control voltage sources can increase a relative time delay between the first and second discharges, and the other of said first and second control voltage sources can decrease the relative time delay.

6. A laser system according to claim 3, wherein:
    the second control voltage source can control a timing of the second discharge by adjusting at least one of a voltage and duration of the control voltage being applied.

7. A laser system according to claim 3, further comprising:
    a processing unit capable of sending a control signal to the second voltage control source applying a control voltage to said second compression branch in order to adjust at least one of a voltage level and a duration of the control voltage.

8. A laser system according to claim 3, wherein:
    the second control voltage source is decoupled from the common pulse by at least one decoupling diode.

9. A laser system according to claim 3, wherein:
    the second control voltage source is decoupled from the common pulse by one of a control inductor and a control capacitor.

10. A laser system according to claim 1, wherein:
    the first control voltage source can control a timing of the first discharge by adjusting at least one of a voltage and duration of the control voltage being applied.

11. A laser system according to claim 1, further comprising:
    a storage capacitor for each of said first and second compression branches, each storage capacitor capable of being charged by the common pulse received from said common pulser circuit and capable of discharging upon saturation of a corresponding inductor.

12. A laser system according to claim 1, further comprising:
    a power supply providing a high voltage to the common pulser circuit.

13. A laser system according to claim 12, further comprising:
    a common storage capacitor for storing the charge from the power supply until the common pulser circuit sends the charge as the common pulse.

14. A laser system according to claim 1, wherein:
    the switch of the common pulser circuit is an insulated gate, bi-polar transistor (IGBT).

15. A laser system according to claim 1, wherein:
    the first discharge chamber is a master oscillator; and
    the second discharge chamber is a power amplifier, the master oscillator and power amplifier being arranged in a MOPA configuration such that a light pulse discharged from the master oscillator is received and amplified by the power amplifier.

16. A laser system according to claim 1, further comprising:
a trigger signal generator being capable of providing a trigger signal to the common pulser circuit.

17. A laser system according to claim 16, further comprising:
a processing unit capable of determining a delay between the providing of the trigger signal and a toggling of the switch of the common pulser circuit.

18. A laser system according to claim 16, further comprising:
a processing unit capable of determining a delay between the providing of the trigger signal and a discharge in each of the first and second discharge chambers.

19. A laser system according to claim 17, further comprising:
a discharge detector for at least one of said first and second discharge chambers, each discharge detector being in communication with the processing unit for providing a timing of a discharge in a respective discharge chamber.

20. A laser system according to claim 1, further comprising:
a processing unit capable of sending a control signal to the first voltage control source applying a control voltage to said first compression branch in order to adjust at least one of a voltage level and a duration of the control voltage.

21. A system according to claim 1, further comprising:
a feedback loop in communication with a processing unit and capable of detecting drifts in a time delay between a discharge in the first discharge chamber and a discharge in the second discharge chamber, the feedback loop capable of providing a feedback signal to said processing unit to be used in determining the delay.

22. A laser system according to claim 1, further comprising:
a reset current module for at least one of said first and second compression branches, each reset current module capable of providing a reset current to a respective compression branch.

23. A laser system according to claim 1, further comprising:
at least one decoupling diode coupled between said first and second compression branches for decoupling said first and second compression branches.

24. A laser system according to claim 1, wherein:
each of said first and second compression stages includes an inductor having an additional winding to provide a magnetic field with sign opposite to that of the common pulse, whereby the magnetization of the saturable core is returned to an original state after each pulse and a flux content of the saturable core is maximized.

25. A laser system according to claim 1, wherein pre-pulse voltage has a pre-pulse duration approximately 10 to 100 times the duration of the common pulse.

26. A laser system according to claim 1, wherein the pre-pulse has a lower voltage level than the common pulse.

27. A laser system according to claim 1, wherein:
the first control voltage source is decoupled from the common pulse by at least one decoupling diode.

28. A laser system according to claim 1, wherein:
the first control voltage source is decoupled from the common pulse by one of a control inductor and a control capacitor.

29. A laser system according to claim 1, further comprising:
at least one additional saturable inductor for decoupling said first and second compression branches from the common pulse.

30. An excimer or molecular fluorine laser system, comprising:
a master oscillator including therein a first discharge chamber filled with a first gas mixture, the first discharge chamber containing a first pair of electrodes for energizing the first gas mixture and outputting an optical pulse;
a power amplifier including therein a second discharge chamber filled with a second gas mixture, the second discharge chamber containing a second pair of electrodes for energizing the second gas mixture, the power amplifier capable of receiving the optical pulse from the master oscillator and discharging the second pair of electrodes in order to amplify the optical pulse and transmit an output pulse;
a common pulser circuit operable to apply a common pulse;
a first compression branch in electrical communication with the first discharge chamber and operable to receive the common pulse applied by the common pulser circuit, the first compression branch being operable to transmit a first electrical pulse to said first discharge chamber, in response to the applied common pulse, to cause a first discharge in the first discharge chamber, said first compression branch including at least one inductor;
a second compression branch in electrical communication with the second discharge chamber and operable to receive the common pulse applied by the common pulser circuit, the second compression branch being operable to transmit a second electrical pulse to said second discharge chamber, in response to the applied common pulse, to cause a second discharge in the second discharge chamber, said second compression branch including at least one inductor;
a first control voltage source coupled to said first compression branch, the first control voltage source capable of applying a control voltage pre-pulse to said inductor of said first compression branch wherein the voltage level of the pre-pulse is substantially less than the voltage of the first electrical pulse supplied to the first discharge chamber and wherein the length of the pre-pulse is substantially longer than the first electrical pulse supplied to the first discharge chamber and wherein the voltage and length of the pre-pulse is selected to adjust the magnetic flux in the inductor in order to control a timing of the first discharge in the first discharge chamber;
a second control voltage source coupled to said second compression branch, the second control voltage source capable of applying a control voltage pre-pulse to said second compression branch wherein the voltage level of the pre-pulse is substantially less than the voltage of the second electrical pulse supplied to the second discharge chamber and wherein the length of the pre-pulse is substantially longer than the second electrical pulse supplied to the second discharge chamber and wherein the voltage and length of the pre-pulse is selected to adjust the magnetic flux in the inductor in order to control a timing of the second discharge in the second discharge chamber;

first and second discharge detectors, the first discharge detector capable of generating a first detection signal corresponding to a first discharge in the master oscillator, and the second discharge detector capable of generating a second detection signal corresponding to a second discharge in the power amplifier; and a processing device capable of receiving the first and second detection signals and determining a corresponding delay time, the processing device being further capable of adjusting the delay time by sending a control signal to at least one of said first and second control voltage sources.

31. A laser system according to claim 30, wherein the first control voltage source controls at least one of the voltage and duration of the pre-pulse voltage.

32. A laser system according to claim 30, wherein the second control voltage source controls at least one of the voltage and duration of the pre-pulse voltage.

33. A laser system according to claim 30, further comprising:
a first storage capacitor for said first compression branch and a second storage capacitor for said second compression branch, each of said first and second storage capacitors capable of being charged by the common pulse received from said common pulser circuit.

34. A system according to claim 30, further comprising:
a reset current unit capable of applying a reset current to the common pulser circuit in order to control at least one of a timing and a shape of the common pulse.

35. A laser system according to claim 30, further comprising:
a first reset current module for said first compression branch and a second reset current module for said second compression branch, each of said first and second reset current modules being capable of providing a reset current.

36. A laser system according to claim 30, further comprising:
at least one decoupling diode coupled between said first and second compression branches for decoupling said first and second compression branches.

37. A laser system according to claim 30, further comprising:
at least one additional saturable inductor for decoupling said first and second compression branches from the common pulse.

38. A method of generating an output beam in an excimer or molecular fluorine laser system, comprising:
generating an optical pulse using a first timed discharge in a master oscillator;
passing the optical pulse through a power amplifier, whereby the optical pulse is amplified by a second timed discharge in the power amplifier; and
providing a first electrical pulse from a first compression branch to discharge electrodes of the master oscillator to cause the first timed discharge, said first compression branch including at least one inductor;
providing a second electrical pulse from a second compression branch to discharge electrodes of the power amplifier to cause the second timed discharge, said second compression branch including at least one inductor; and
controlling a relative delay between the first and second timed discharges by applying a control voltage pre-pulse to the inductor in at least one of said first and second compression branches wherein the voltage level of the pre-pulse is substantially less than the voltage of the electrical pulse supplied to the associated discharge electrodes and wherein the length of the pre-pulse is substantially longer than the electrical pulse supplied to the associated discharge electrodes and wherein the voltage and length of the pre-pulse is selected to adjust the magnetic flux in the inductor.

39. A method according to claim 38, wherein controlling the relative delay includes applying a pre-ionization voltage to pre-ionization electrodes of at least one of the master oscillator and power amplifier.

40. A method according to claim 38, further comprising:
monitoring the timing of the first and second timed discharges in order to control the timing of subsequent first and second timed discharges.

41. A method of generating an output beam in an excimer or molecular fluorine laser system, comprising:
applying a common electrical pulse to first and second compression branches in response to receiving a trigger signal, both of said first and second compression branches including an inductor;
applying a control voltage pre-pulse to the inductor of one of said first and second compression branches;
outputting a first electrical pulse from the first compression branch to a master oscillator in order to cause a first discharge and generate an optical pulse; and
outputting a second electrical pulse from the second compression branch to a power amplifier in order to cause a second discharge, the power amplifier receiving the optical pulse from the master oscillator such that the second discharge amplifies the optical pulse in order to transmit an output pulse, and wherein the voltage level of the pre-pulse is substantially less than the voltage of the electrical pulse supplied to the associated discharge and wherein the length of the pre-pulse is substantially longer than the electrical pulse supplied to the associated discharge and wherein the voltage and length of the pre-pulse is selected to adjust the magnetic flux in the inductor in order to adjust the relative timing between said first and second discharges.

42. A method according to claim 41, further comprising:
monitoring the timing of the first and second discharges.

43. A method according to claim 41, further comprising:
using a processing device to receive information about the relative timing of the first and second discharges and to adjust the timing of subsequent first and second discharges by sending a control signal to a control voltage source operable to apply the control voltage.

44. A method according to claim 41, further comprising:
using a processing device to receive information about the relative timing of the first and second discharges and to adjust the timing of subsequent first and second discharges by sending a control signal to a source of control voltage for at least one of the master oscillator and the power amplifier.

45. An excimer or molecular fluorine laser system, comprising:
a master oscillator including therein a first discharge chamber filled with a first gas mixture, the first discharge chamber containing a first pair of electrodes for energizing the first gas mixture and outputting an optical pulse;
a power amplifier including therein a second discharge chamber filled with a second gas mixture, the second discharge chamber containing a second pair of electrodes for energizing the second gas mixture, the power amplifier capable of receiving the optical pulse from the master oscillator and discharging the second pair of electrodes in order to amplify the optical pulse and transmit an output pulse;

a common pulser circuit operable to apply a common pulse;

a first compression branch in electrical communication with the first discharge chamber and operable to receive the common pulse applied by the common pulser circuit, the first compression branch being operable to transmit a first electrical pulse to said first discharge chamber, in response to the applied common pulse, to cause a first discharge in the first discharge chamber, said first compression branch including at least one inductor;

a second compression branch in electrical communication with the second discharge chamber and operable to receive the common pulse applied by the common pulser circuit, the second compression branch being operable to transmit a second electrical pulse to said second discharge chamber, in response to the applied common pulse, to cause a second discharge in the second discharge chamber, said second compression branch including at least one inductor;

a first control voltage source coupled to said first compression branch, the first control voltage source capable of applying a control voltage pre-pulse to the inductor in said first compression branch wherein the voltage level of the pre-pulse is substantially less than the voltage of the first electrical pulse supplied to the first discharge chamber and wherein the length of the pre-pulse is substantially longer than the first electrical pulse supplied to the first discharge chamber and wherein the voltage and length of the pre-pulse is selected to adjust the magnetic flux in the inductor in order to control a timing of the first discharge in the first discharge chamber;

a second control voltage source coupled to said second compression branch, the second control voltage source capable of applying a control voltage pre-pulse to the inductor in said second compression branch wherein the voltage level of the pre-pulse is substantially less than the voltage of the second electrical pulse supplied to the second discharge chamber and wherein the length of the pre-pulse is substantially longer than the second electrical pulse supplied to the second discharge chamber and wherein the voltage and length of the pre-pulse is selected to adjust the magnetic flux in the inductor in order to control a timing of the second discharge in the second discharge chamber;

a first pre-ionization voltage source coupled to said first discharge chamber for applying a first pre-ionization voltage;

a second pre-ionization voltage source coupled to said second discharge chamber for applying a second pre-ionization voltage;

first and second discharge detectors, the first discharge detector capable of generating a first detection signal corresponding to a first discharge in the master oscillator, and the second discharge detector capable of generating a second detection signal corresponding to a second discharge in the power amplifier; and a processing device capable of receiving the first and second detection signals and determining a corresponding delay time, the processing device being further capable of adjusting the delay time by sending a control signal to one of said first and second control voltage sources when a timing adjustment is greater than a timing adjustment threshold, the processing device being further capable of adjusting the delay time by sending a control signal to at least one of said first and second pre-ionization voltage sources when the timing adjustment is less than the timing adjustment threshold.

46. A laser system according to claim 45, wherein:

the timing adjustment threshold is on the order of about 5 ns.

* * * * *